US012142211B2

(12) United States Patent
Wei et al.

(10) Patent No.: US 12,142,211 B2
(45) Date of Patent: Nov. 12, 2024

(54) DISPLAY SUBSTRATE, PIXEL CIRCUIT, DRIVING METHOD AND DISPLAY APPARATUS

(71) Applicants: Yunnan Invensight Optoelectronics Technology Co., Ltd., Yunnan (CN); BOE Technology Group Co., Ltd., Beijing (CN)

(72) Inventors: Junbo Wei, Beijing (CN); Dachao Li, Beijing (CN); Shengji Yang, Beijing (CN); Pengcheng Lu, Beijing (CN); Kuanta Huang, Beijing (CN); Zhijian Zhu, Beijing (CN); Yuanlan Tian, Beijing (CN)

(73) Assignees: Yunnan Invensight Optoelectronics Technology Co., Ltd., Yunnan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/795,869

(22) PCT Filed: Sep. 15, 2021

(86) PCT No.: PCT/CN2021/118575
§ 371 (c)(1),
(2) Date: Jul. 27, 2022

(87) PCT Pub. No.: WO2023/039761
PCT Pub. Date: Mar. 23, 2023

(65) Prior Publication Data
US 2024/0185779 A1 Jun. 6, 2024

(51) Int. Cl.
*G09G 3/3233* (2016.01)
*G09G 3/00* (2006.01)

(52) U.S. Cl.
CPC ........... *G09G 3/3233* (2013.01); *G09G 3/006* (2013.01); *G09G 2300/0819* (2013.01);
(Continued)

(58) Field of Classification Search
CPC ................ G09G 3/3233; G09G 3/006; G09G 2300/0819; G09G 2300/0861; G09G 2310/08; G09G 2320/0233; G09G 2330/08
See application file for complete search history.

(56) References Cited

U.S. PATENT DOCUMENTS

2005/0068274 A1 3/2005 Lo
2014/0085171 A1 3/2014 Jo
(Continued)

FOREIGN PATENT DOCUMENTS

CN 104751771 A 7/2015
CN 106205495 A 12/2016
(Continued)

*Primary Examiner* — Amit Chatly
(74) *Attorney, Agent, or Firm* — Ling Wu; Stephen Yang; Ling and Yang Intellectual Property

(57) ABSTRACT

A display substrate, a pixel circuit, a driving method and a display device are provided. The display substrate includes a substrate and a plurality of repeating units arranged in an array on one side of the substrate, each repeating unit includes at least two light emitting elements and at least two pixel circuits, each pixel circuit includes a first transistor, a second transistor and a third transistor, and the third transistor is configured to drive the light emitting element to emit light; each repeating unit further includes a first region, a second region and a third region arranged continuously in the first direction, the first region includes at least two of the first transistors, the third region including at least two of the third transistors, and the type of the first transistor and the type of the third transistor are different.

16 Claims, 15 Drawing Sheets

(52) U.S. Cl.
CPC . *G09G 2300/0861* (2013.01); *G09G 2310/08* (2013.01); *G09G 2320/0233* (2013.01); *G09G 2330/08* (2013.01)

(56) References Cited

U.S. PATENT DOCUMENTS

| | | | | |
|---|---|---|---|---|
| 2018/0218681 | A1 | 8/2018 | Cai | |
| 2019/0131371 | A1 | 5/2019 | Yi et al. | |
| 2019/0251905 | A1 | 8/2019 | Yang et al. | |
| 2020/0090590 | A1 | 3/2020 | Kim et al. | |
| 2020/0211464 | A1* | 7/2020 | Yue | G09G 3/3266 |
| 2020/0243562 | A1 | 7/2020 | Liu et al. | |
| 2020/0302840 | A1* | 9/2020 | Kim | G09G 3/006 |
| 2021/0118371 | A1* | 4/2021 | Qing | G09G 3/3233 |
| 2021/0134918 | A1 | 5/2021 | Moon et al. | |
| 2021/0217353 | A1* | 7/2021 | Zhao | H01L 27/124 |
| 2021/0257525 | A1 | 8/2021 | Ryu et al. | |
| 2021/0312866 | A1* | 10/2021 | Fan | G09G 3/3233 |
| 2021/0375700 | A1* | 12/2021 | Xiao | H01L 22/22 |
| 2022/0246072 | A1* | 8/2022 | Cho | G09G 3/3233 |
| 2022/0254851 | A1 | 8/2022 | He et al. | |
| 2022/0351673 | A1* | 11/2022 | Kim | G09G 3/32 |
| 2023/0113488 | A1* | 4/2023 | Zhao | G09G 3/32 345/204 |
| 2024/0087535 | A1* | 3/2024 | Nishiyama | G09G 3/3266 |

FOREIGN PATENT DOCUMENTS

| | | | |
|---|---|---|---|
| CN | 107424570 | A | 12/2017 |
| CN | 108735153 | A | 11/2018 |
| CN | 109584779 | A | 4/2019 |
| CN | 109755276 | A | 5/2019 |
| CN | 110728946 | A | 1/2020 |
| CN | 112786662 | A | 5/2021 |
| CN | 112802883 | A | 5/2021 |
| CN | 113284924 | A | 8/2021 |
| KR | 10-2019-0074863 | A | 6/2019 |

* cited by examiner

DISPLAY SUBSTRATE, PIXEL CIRCUIT, DRIVING METHOD AND DISPLAY APPARATUS

CROSS-REFERENCE TO RELATED APPLICATION

The present application is a U.S. National Phase Entry of International Application No. PCT/CN2021/118575 having an international filing date of Sep. 15, 2021. The above-identified application is hereby incorporated by reference.

TECHNICAL FIELD

Embodiments of the present disclosure relate to, but are not limited to, the field of display technologies, and in particular to a display substrate, a pixel circuit, a driving method and a display device.

BACKGROUND

An Organic Light-Emitting Diode (OLED) display device has the advantages of thin thickness, light weight, wide viewing angle, active luminescence, continuous and adjustable luminous color, low cost, fast response, low driving voltage, wide working temperature range, simple production process, flexible display, and the like, and is more and more widely used in display fields such as mobile phones, tablet computers, digital cameras. However, pixel circuit often occupies a large area, which is not conducive to OLED display devices to achieve better display effect.

SUMMARY

The following is a summary of subject matters described herein in detail. The summary is not intended to limit the protection scope of claims.

In a first aspect, an embodiment of the present disclosure provides a display substrate, including: a substrate and a plurality of repeating units arranged in an array on a side of the substrate, each repeating unit includes at least two light emitting elements and at least two pixel circuits, each pixel circuit includes a first transistor, a second transistor and a third transistor, and the third transistor is configured to drive the light emitting element to emit light; each repeating unit further includes a first region, a second region and a third region arranged continuously in the first direction, the first region includes at least two of the first transistors, the third region including at least two of the third transistors, and the type of the first transistor and the type of the third transistor are different.

In another aspect, an embodiment of the present disclosure further provides a pixel circuit including a first transistor, a second transistor, and a third transistor, wherein a control electrode of the first transistor is connected to a scan signal line, a first electrode of the first transistor is connected to a data signal line, and a second electrode of the first transistor is connected to a first node; a control electrode of the second transistor is connected to a reference signal line, a first electrode of the second transistor is connected to a second node, and a second electrode of the second transistor is connected to a first electrode of a light emitting element; a control electrode of the third transistor is connected to the first node, a first electrode of the third transistor is connected to a first power supply line, and a second electrode of the third transistor is connected to the second node;

the first transistor is configured to supply the signal of the data signal line to the third transistor under the control of the signal of the scan signal line; the second transistor is configured to supply a signal of the second node to a first electrode of the light emitting element under the control of a signal of a reference signal line; and the third transistor is configured to supply the signal of the first power supply line to the second node under the control of the signal of the data signal line.

In another aspect, the embodiment of the present disclosure further provides a driving method, including a data writing stage and an emitting stage, wherein in the data writing stage, supplying a signal of the data signal line to the control electrode of the third transistor under the control of the signal of the scan signal line; in the emitting stage, turning the third transistor on under the control of the signal of the data signal line, turning the second transistor on under the control of the signal of the reference signal line, and supplying the signal of the first power supply line to the first electrode of the light emitting element through the third transistor and the second transistor to drive the light emitting element to emit light.

In another aspect, the embodiment of the present disclosure further provides a driving method, including a first test stage, wherein in the first test stage, switching a connection state of the third transistor from a first connection state to a second connection state under the control of a signal of a test enable signal line, supplying a fixed voltage output by the fourth power supply line to the third transistor, and controlling the third transistor to be in a forward bias state; wherein, the first connection state is that the substrate terminal of the third transistor is connected to the third power supply line, and the second connection state is that the substrate terminal of the third transistor is connected to the fourth power supply line; and supplying a fixed voltage output by the fourth power supply line to the first electrode of the light emitting element under the control of the signal of the reference signal line to cause the light emitting element to emit light.

In another aspect, the embodiment of the present disclosure further provides a driving method, including a second test stage, wherein in the second test stage, switching the connection state of the fourth transistor between a third connection state and a fourth connection state under the control of a signal of a switch signal line, and supplying the fourth transistor with a signal of a monochrome test signal line or a signal of a fourth power supply line; wherein, the third connection state is that the second electrode of the fourth transistor is connected to the monochrome test signal line, and the fourth connection state is that the second electrode of the fourth transistor is connected to the fourth power supply line; and controlling a light emitting element connected to the monochrome enable signal line to emit a monochrome light ray corresponding to the signal of the monochrome enable signal line under the control of a signal of the monochrome enable signal line; the monochrome enable signal line includes: a first enable signal line connected to a light emitting element that emits a first emitting color, a second enable signal line connected to a light emitting element that emits a second emitting color, and a third enable signal line connected to a light emitting element that emits a first emitting color.

In another aspect, an embodiment of the present disclosure provides a display apparatus, which includes the display substrate and the pixel circuit described in the above embodiment.

Other characteristics and advantages of the present disclosure will be elaborated in the following specification, and moreover, partially become apparent from the specification or are understood by implementing the present disclosure. Other advantages of the present disclosure may be achieved and obtained through solutions described in the specification and the drawings.

Other aspects will become apparent upon reading and understanding the accompanying drawings and the detailed description.

BRIEF DESCRIPTION OF DRAWINGS

The drawings are used for providing understanding of technical solutions of the present disclosure, constitute a part of the specification, and together with the embodiments of the present disclosure, are used for explaining the technical solutions of the present disclosure but not to form limitations on the technical solutions of the present disclosure. Shapes and sizes of each component in the drawings do not reflect actual scales, and are only intended to schematically illustrate contents of the present disclosure.

DETAILED DESCRIPTION

Figure 1A:
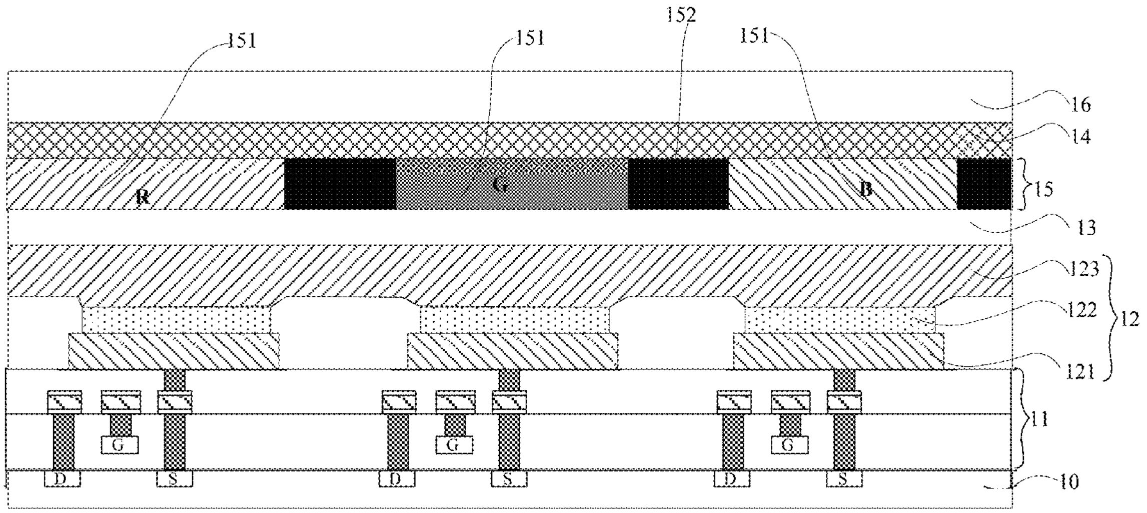
FIG. 1A is a schematic diagram of a structure of a display substrate in an exemplary embodiment of the present disclosure.

However, the description is exemplary and unrestrictive, and more embodiments and implementation solutions are possible within a scope contained in the embodiments described herein. Although many possible feature combinations are shown in the drawings and discussed in exemplary implementation modes, many other combinations of the disclosed features are possible. Unless expressly limited, any feature or element of any embodiment may be used in combination with, or may replace, any other feature or element in any other embodiment.

When a representative embodiment is described, a method or process may already be presented in a specific sequence of acts in the specification. However, to an extent that the method or process does not depend on a specific sequence of the acts herein, the method or process should not be limited to the acts in the specific sequence. As will be understood by those of ordinary skill in the art, other act orders are possible. Therefore, the specific order of the steps illustrated in the specification should not be interpreted as a limitation on claims. In addition, the claims with respect to the method or process should not be limited to execute their steps according to the written sequence. Those skilled in the art may easily understand that these sequences may change, and are still maintained in the spirit and scope of the embodiments of the disclosure.

In the drawings, a size of each constituent element, a thickness of a layer, or a region is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one embodiment of the present disclosure is not limited to the shapes, numerical values, or the like shown in the drawings.

Ordinal numerals such as "first", "second", and "third" in the specification are set to avoid confusion of constituent elements, but not to set a limit in quantity.

In the specification, for convenience, expressions indicating orientation or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element has a particular orientation and is structured and operated in the particular orientation. Therefore, they cannot be understood as limitations on the present disclosure. The positional relationships between the constituent elements may be changed as appropriate according to a direction according to which each constituent element is described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the specification, "electrical connection" includes a case that constituent elements are connected together through an element with a certain electrical effect. The "element with the certain electrical effect" is not particularly limited as long as electrical signals may be sent and received between the connected constituent elements. For example, "the elements with the certain electrical effect" may be electrodes or wirings, or switch elements, such as transistors, or other functional elements, such as resistors, inductors, capacitors, or the like.

In the specification, a transistor refers to an element that at least includes three terminals, i.e., a gate electrode (aka. gate or control electrode), a drain electrode (aka. drain electrode terminal, drain region, or drain), and a source electrode (aka. source electrode terminal, source region, or source). A transistor has a channel region between a drain electrode and a source electrode, and a current can flow through the drain electrode, the channel region, and the source electrode. It is to be noted that, in the specification, the channel region refers to a region through which the current mainly flows.

In the specification, in order to distinguish two electrodes of a transistor other than a control electrode, one of the two electrodes is directly described as a first electrode, while the other is described as a second electrode. The first electrode may be a drain electrode, and a second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the present specification.

In this specification, "same layer arrangement" is referred to a structure formed by two (or more) structures formed by the same deposition process and patterned through the same composition process, and their materials may be the same or different. For example, the materials of the precursors forming a plurality of structures arranged in the same layer are the same, and the resulting materials may be the same or different.

Transistors in the embodiments of the present disclosure may be Thin Film Transistors (TFTs), or Field Effect Transistors (FETs), or other devices with same characteristics. For example, a thin film transistor used in the embodiments of the present disclosure may include, but is not limited to, an oxide TFT or a Low Temperature Poly-silicon TFT (LTPS TFT). For example, the thin film transistor with a bottom gate structure or a thin film transistor with a top gate structure may be selected as a thin film transistor as long as a switching function may be achieved. Here, no limit is made thereto in the embodiment of the present disclosure. In addition, transistors may be divided into N-type transistors and P-type transistors according to their characteristics. When the transistor is a P-type transistor, the turn-on voltage is a low-level voltage (e.g. 0V, −5V, −10V or other suitable voltage) and the turn-off voltage is a high-level voltage (e.g. 5V, 10V or other suitable voltage). When the transistor is an N-type transistor, the turn-on voltage is a high-level voltage (e.g. 5V, 10V or other suitable voltage) and the turn-off voltage is a low-level voltage (e.g. 0V, −5V, −10V or other suitable voltage).

OLED display devices have small pixel sizes (e.g. less than 100 microns) and may be used in micro-display applications, for example, widely used in near-eye display fields of Virtual Reality (VR) or Augmented Reality (AR). However, a pixel circuit generally includes a plurality of transistors and capacitors. Limited by process preparation accuracy and layout design, pixel circuits tend to occupy a large area in sub-pixels, which is not conducive to the reduction of pixel size, or to the realization of high resolution (such as Pixel Per Inch (PPI)) display, or to highlight and high contrast display. It can lead to the degradation of pixel circuit performance and reliability, and then make the display uniformity and reliability deteriorate. Therefore, higher requirements are put forward for the structural design of display substrate, such as the arrangement of pixels and signal lines. In addition, when the cathode and anode of individual OLED pixels are short-circuited, latch-up effect will occur, which will lead to further failure or damage of pixel circuit, eventually cause the whole display region to fail and seriously affect user experience.

An embodiment of the present disclosure provides a display substrate. In an exemplary embodiment, the display substrate may be an OLED display substrate. FIG. 1A is a schematic diagram of a structure of a display substrate according to an embodiment of the present disclosure. As shown in FIG. 1A, in a direction perpendicular to the display device, the OLED display substrate may include a substrate 10, a pixel circuit layer 11 disposed on the substrate 10, and a plurality of light emitting elements 12 disposed on a side of the pixel circuit layer 11 away from the substrate 10. For example, the pixel circuit layer 11 may include a plurality of pixel circuits, each configured to drive a plurality of light emitting elements (i.e., OLED pixels). A circuit structure and layout of the pixel circuit may be designed according to an actual situation, which is not limited by the embodiments of the disclosure. For clarity and simplicity, FIG. 1A only schematically illustrates one transistor in each pixel circuit in the pixel circuit layer 11. The transistor is arranged to be coupled with the subsequently formed light-emitting element. For example, the pixel circuit layer 11 may further include a plurality of lines, such as a scan signal line and a data signal line, which is not limited by the embodiments of the disclosure. For example, the substrate 10 may be a silicon-based substrate, which may be a bulk silicon-based substrate or a Silicon-On-Insulator (SOI) substrate. For example, the pixel circuit may be prepared on the silicon substrate through a silicon semiconductor process (e.g., CMOS process), and the light-emitting element may be prepared on the silicon substrate with the pixel circuit.

In an illustrative embodiment, as shown in FIG. 1A, taking the transistor as an example, the transistor in the pixel circuit layer 11 may include a gate electrode G, a source electrode S, and a drain electrode D. For example, the three electrodes are electrically connected to the three electrode connection parts in correspondence, respectively. For example, electrical connections are established through vias filled with tungsten metal (ie, tungsten vias, W-vias). Furthermore, the three electrodes can be electrically connected to other electrical structures (e.g., transistors, wirings, or light-emitting elements, etc.) through corresponding electrode connections, respectively.

In an exemplary embodiment, as shown in FIG. 1A, the light emitting element 12 may include a first electrode 121 (e.g. as an anode), an organic emitting function layer 122, and a second electrode 123 (e.g. as a cathode) that are stacked in order. For example, the first electrode 121 may be electrically connected to the source electrode S of the corresponding transistor through the tungsten via (such as through a connecting part corresponding to the source electrode S). Herein, the positions of the source electrode S and the drain electrode D may be exchanged, i.e., the first electrode 121 may be connected to the drain electrode D instead. For example, the organic light-emitting function layer 122 may include an Emitted-Light (EL) layer, and may further include one or more of an electron injection layer, an electron transport layer, a hole injection layer, and a hole transport layer. For example, the second electrode 123 may be a transparent electrode. For example, the second electrode 123 may be a common electrode, that is, a plurality of light emitting elements (i.e., sub-pixels) in the light-emitting element 12 may share an entire surface of the second electrode 123.

In an illustrative embodiment, as shown in FIG. 1A, in the direction perpendicular to the display apparatus, the OLED display device may further include: a first encapsulation layer 13, a color filtering layer 15, a second encapsulation layer 14, and a cover plate 16 that are arranged on the plurality of light-emitting elements 12 in turn. For example, the color filtering layer 15 may include: a Color Filter (CF) 151 and Black Matrix (BM) 152 located between adjacent color filters 151. The color filter 151 corresponds to the light-emitting elements 12, and are arranged to enable the light emitted from the light-emitting elements to transmit. One color filter 151 and the corresponding one light-emitting element may form a sub-pixel. For example, the color filter 151 may include a Red (R) filter unit, a Green (G) filter unit, and a Blue (B) filter unit. The Red (R) filter unit, the Green (G) filter unit, and the Blue (B) filter unit may respectively correspond to a Red (R) sub-pixel, a Green (G) sub-pixel, and a Blue (B) sub-pixel. For example, the material of the color filter 151 may be color photoresist (also called color photoresist for short), but is not limited thereto. For example, the first encapsulation layer 13 and the second encapsulation layer 14 may be any one or more of polymer and ceramic Thin Film Encapsulation (TFE) layers, but is not limited thereto. For example, the cover plate 16 may be a glass cover plate, but is not limited thereto.

In an exemplary embodiment, the first direction DR1 may be an extension direction of the scan signal line, and the second direction DR2 may be an extension direction of the data signal line. For example, the first direction DR1 may be a row direction of the array, and the second direction DR2 may be a column direction of the array. For example, the second direction DR2 intersects the first direction DR1 (e.g., the second direction DR2 is perpendicular to the first direction DR1).

Embodiments of the present disclosure provide a display substrate, which may include: a substrate and a plurality of repeating units arranged in an array on a side of the substrate, each repeating unit may include at least two light emitting elements and at least two pixel circuits, each pixel circuit may include a first transistor, a second transistor and a third transistor, and the third transistor is configured to drive the light emitting element to emit light; each repeating unit may further include a first region, a second region and a third region arranged continuously in the first direction DR1, the first region may include at least two of the first transistors, the third region including at least two of the third transistors, and the type of the first transistor and the type of the third transistor are different.

In an exemplary embodiment, the second region may include at least two of the second transistors, wherein the type of the first transistor and the type of the second transistor are the same.

In an exemplary embodiment, the size of the third transistor is larger than the size of the first transistor and is larger than the size of the second transistor. For example, a plurality of third transistors in the third region may be arranged in an array. Thus, by arranging transistors with relatively large sizes in the same region in an array, reasonable optimization of transistor arrangement may be achieved, and more space may be saved, thereby reducing the area of sub-pixels occupied by pixel circuits.

In an exemplary embodiment, each repeating unit may include six of the first transistors, six of the second transistors, and six of the third transistors.

The arrangement of transistors in the repeating unit in the display substrate in the embodiment of the present disclosure will be described below with reference to a repeating unit and taking as an example that one repeating unit includes six first transistors T1, six second transistors T2, and six third transistors T3.

Figure 1B:
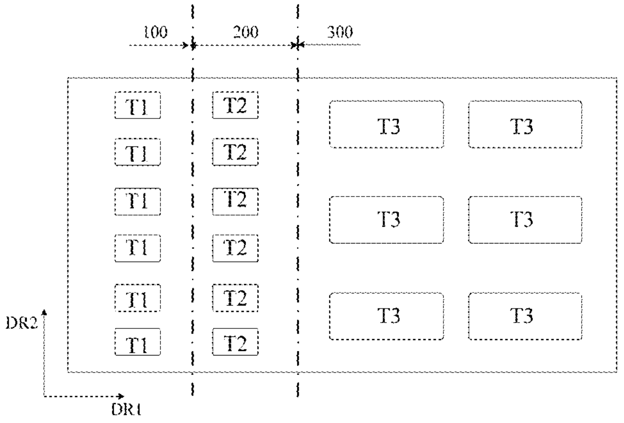
FIG. 1B is a schematic diagram of a first arrangement of transistors in a display substrate in an exemplary embodiment of the present disclosure.

In an exemplary embodiment, as shown in FIGS. 1B to 1F, each of the repeating units may include a first region 100, a second region 200, and a third region 300 arranged continuously in the first direction DR1. The arrangement of transistors in the display substrate in the embodiment of the present disclosure may include, but is not limited to, the following:

in an exemplary embodiment, as shown in FIG. 1B, six first transistors T1 are sequentially disposed in the second direction DR2 in the first region 100, six second transistors T2 are sequentially disposed in the second direction DR2 in the second region 200, and six third transistors T3 are arranged in an array in the third region 300. In this way, by arranging the same transistors in the same region, the transistors with relatively small size are arranged in a row, and the transistors with relatively large size are arranged in an array, which can achieve reasonable optimization of transistor arrangement with a smaller layout area. The area of sub-pixels occupied by pixel circuit is reduced, thereby facilitating the reduction of pixel size, and achieving higher PPI and better display effect.

Figure 1C:
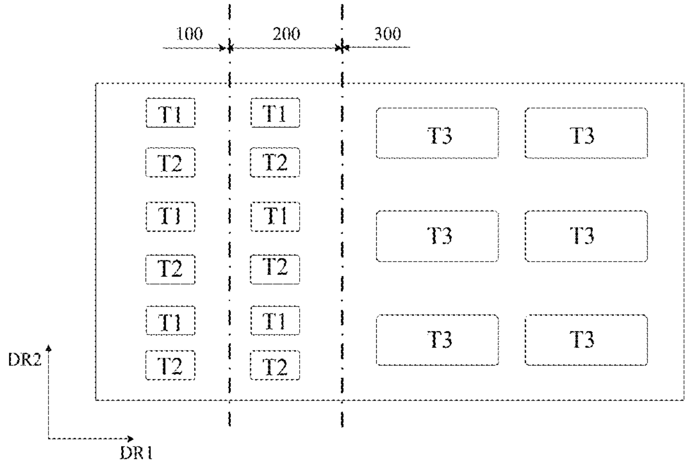
FIG. 1C is a schematic diagram of a second arrangement of transistors in a display substrate in an exemplary embodiment of the present disclosure.

In an exemplary embodiment, as shown in FIG. 1C, three first transistors T1 and three second transistors T2 are alternately arranged in the second direction DR2 in the first region 100, three first transistors T1 and three second transistors T2 are alternately arranged in the second direction DR2 in the second region 200, and six third transistors T3 are arranged in an array in the third region 300.

Figure 1D:
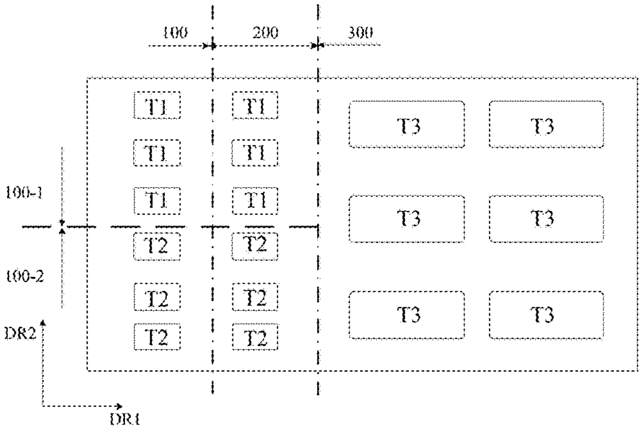
FIG. 1D is a schematic diagram of a third arrangement of transistors in a display substrate in an exemplary embodiment of the present disclosure.

In an exemplary embodiment, as shown in FIG. 1D, each of the first region 100 and the second region 200 may include a first sub-region 100-1 and a second sub-region 100-2 sequentially disposed along a second direction DR2. In each first sub-region 100-1, three first transistors T1 are sequentially disposed along the second direction DR2, in each second sub-region 100-2, three second transistors T2 are sequentially disposed along the second direction DR2, and in the third region 300, six third transistors T3 are arranged in an array.

Figure 1E:
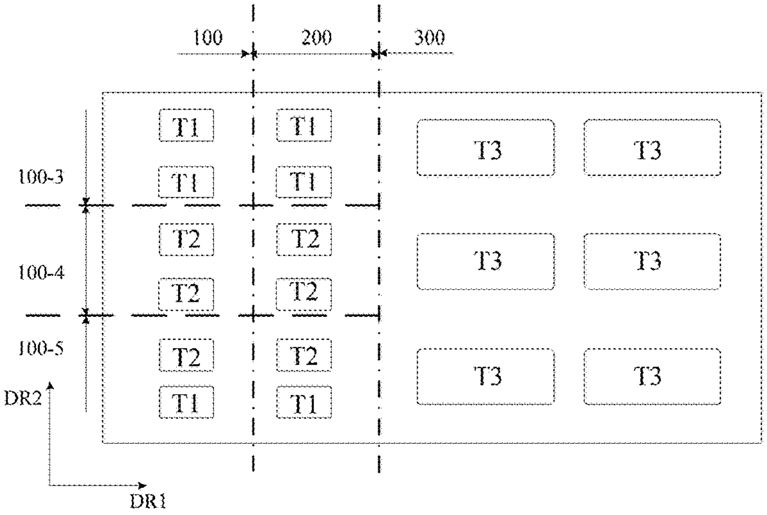
FIG. 1E is a schematic diagram of a fourth arrangement of transistors in a display substrate in an exemplary embodiment of the present disclosure.

In an exemplary embodiment, as shown in FIG. 1E, both the first region 100 and the second region 200 may include a third sub-region 100-3, a fourth sub-region 100-4, and a fifth sub-region 100-5 arranged in sequence in the second direction DR2. In each third sub-region 100-3, two first transistors T1 are sequentially arranged in the second direction DR2, in each fourth sub-region 100-4, two second transistors T2 are sequentially arranged in the second direction DR2, and in each fifth sub-region 100-5, a second transistor T2 and a first transistor T1 are alternately arranged in the second direction DR2; and in the third region 300, six third transistors T3 are arranged in an array.

Figure 1F:
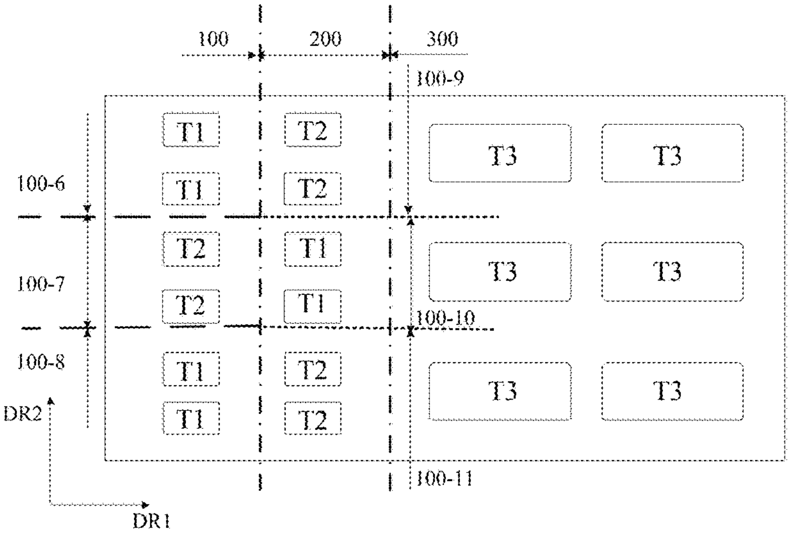
FIG. 1F is a schematic diagram of a fifth arrangement of transistors in a display substrate in an exemplary embodiment of the present disclosure.

In an exemplary embodiment, as shown in FIG. 1F, the first region 100 may include a sixth sub-region 100-6, a seventh sub-region 100-7, and an eighth sub-region 100-8 arranged in sequence along the second direction DR2. In the sixth sub-region 100-6, two first transistors T1 are arranged in sequence along the second direction DR2, in the seventh sub-region 100-7, two second transistors T2 are arranged in sequence along the second direction DR2, and in the eighth sub-region 100-8, two first transistors T1 are arranged in sequence along the second direction DR2. Also, the second region 200 may include a ninth sub-region 100-9, a tenth sub-region 100-10, and an eleventh sub-region 100-11 arranged in sequence along the second direction DR2. In the ninth sub-region 100-9, two second transistors T2 are arranged in sequence along the second direction DR2, in the tenth sub-region 100-10, two first transistors T1 are arranged in sequence along the second direction DR2, and in the eleventh sub-regions 100-11, two second transistors T2 are arranged in sequence along the second direction DR2; and in the third region 300, six third transistors T3 are arranged in an array.

Certainly, in addition to the above-mentioned arrangement, other suitable arrangements may be used, which are not limited in the embodiments of the present disclosure here.

As such, in a display substrate provide by at least one embodiment of the present disclosure, according to the pixel circuit structure, by rationally optimizing transistor arrangement, optimized layout and wiring may be achieved; full play is given to the layout space, and a smaller layout area may be achieved. The area of sub-pixels occupied by the pixel circuit may be reduced, and it is beneficial to the reduction of pixel size (for example, the pixel area obtained by 4.2 μm (micron)×3.15 μm=13.23 $μm^2$ may be achieved), high PPI and good display effect may be achieved, layout and wiring may be optimized, pixel circuit array may be optimized, sub-pixel area of 4.2 μm×3.15 μm may be achieved, high resolution (PPI) may be achieved, and good display effect may be achieved.

For example, the display substrate may be applied to a virtual reality device or an enhanced display device. For example, the display substrate may be a silicon-based OLED display substrate, or a Quantum-dot Light Emitting Diode (QLED) display substrate, or other types of display substrates. Here, no limit is made thereto in the embodiment of the present disclosure.

Figure 2:
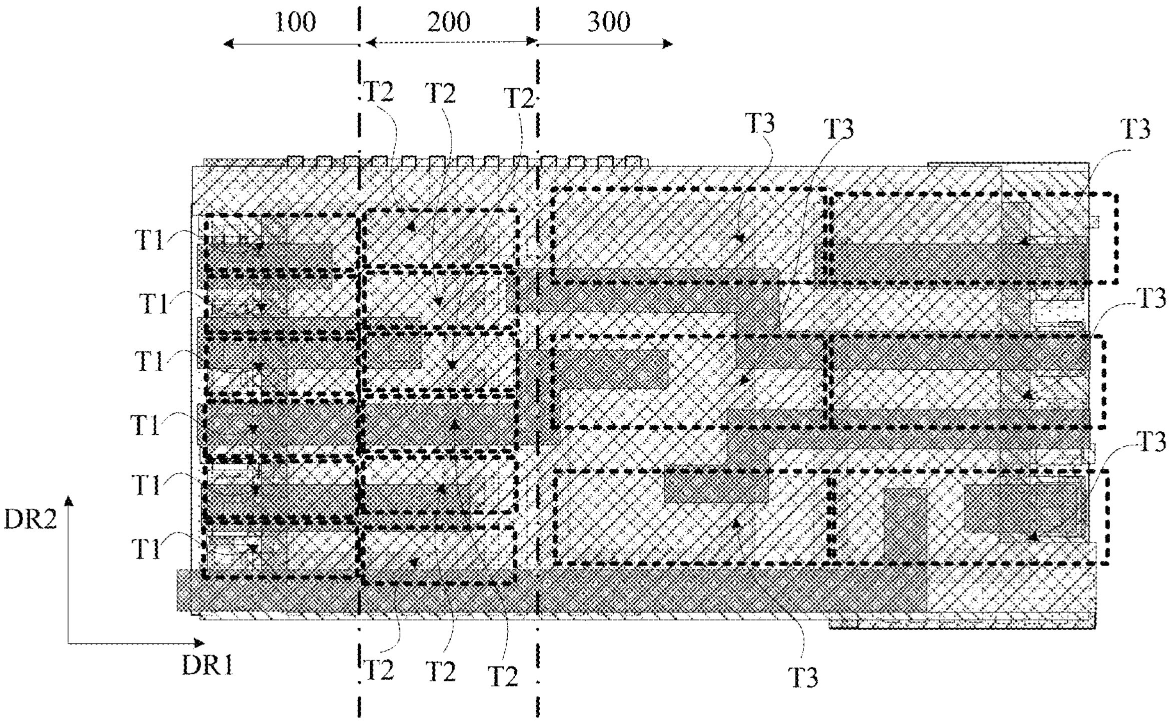
FIG. 2 is a schematic diagram of another structure of a display substrate in an exemplary embodiment of the present disclosure.

For example, taking one repeating unit including six first transistors T1, six second transistors T2 and six third transistors T3 as an example, and taking the transistor arrangement shown in FIG. 1B as an example, FIG. 2 is a schematic diagram of another structure of a display substrate in an exemplary embodiment of the present disclosure. As shown in FIG. 2, the display substrate may include: a substrate (not shown) and a plurality of repeating units arranged in an array on a side of the substrate. Wherein, each repeating unit may include: six light emitting elements (not shown) and six pixel circuits; each pixel circuit may include: a first transistor T1, a second transistor T2 and a third transistor T3. Each repeating unit may further include: a first region 100, a second region 200, and a third region 300 arranged continuously in a first direction DR1. The first region 100 may include six first transistors T1 arranged side by side in the second direction DR2, the second region 200 may include six second transistors T2 arranged side by side along the second direction DR2, and the third region 300 may include six third transistors T3 arranged in a three-row two-column array along the first direction DR1 and the second direction DR2, where the second direction DR2 intersects the first direction DR1 (e.g., the second direction DR2 is perpendicular to the first direction DR1). Wherein, "side by side" as used in embodiments of the present disclosure may mean being arranged on a line. Here, FIG. 2 illustrates by taking one repeating unit as an example.

In an exemplary embodiment, a light emitting element and a pixel circuit for driving the light emitting element may form one sub-pixel. Three sub-pixels may form one pixel, and two pixels may form one repeating unit, i.e. six light emitting elements and six pixel circuits for driving the light emitting elements may form one repeating unit. Here, no limit is made thereto in the embodiment of the present disclosure.

The pixel circuit in the display substrate in the embodiment of the present disclosure will be described below with reference to the accompanying drawings.

Embodiments of the present disclosure further provide a pixel circuit, the pixel circuit may include: an input sub-circuit, a storage sub-circuit, a drive sub-circuit, and a transmission sub-circuit, wherein the input sub-circuit is connected to the data signal line Vdata, the scan signal line Scan, and the first node N1, and is configured to store the data signal line Vdata to the storage sub-circuit and supply the signal of the data signal line Vdata to the drive sub-circuit under the control of the signal of the scan signal line Scan; the storage sub-circuit is connected to the first node N1 and the second power supply line VSS; the drive sub-circuit is connected to the first node N1, the first power supply line VDD, the second node N2, and the third power supply line Vsub, and is configured to supply the signal of the first power supply line VDD to the second node N2 under the control of the signal of the data signal line Vdata; the transmission sub-circuit is connected to the second node N2, the reference signal line Vref, and the first electrode (for example, an anode) of the light emitting element L, and is configured to supply the signal of the second node N2 to the first electrode of the light emitting element L under the control of the signal of the reference signal line Vref; and a second electrode (e.g. a cathode) of the light emitting element L is connected to a second power supply line VSS.

Figure 3:
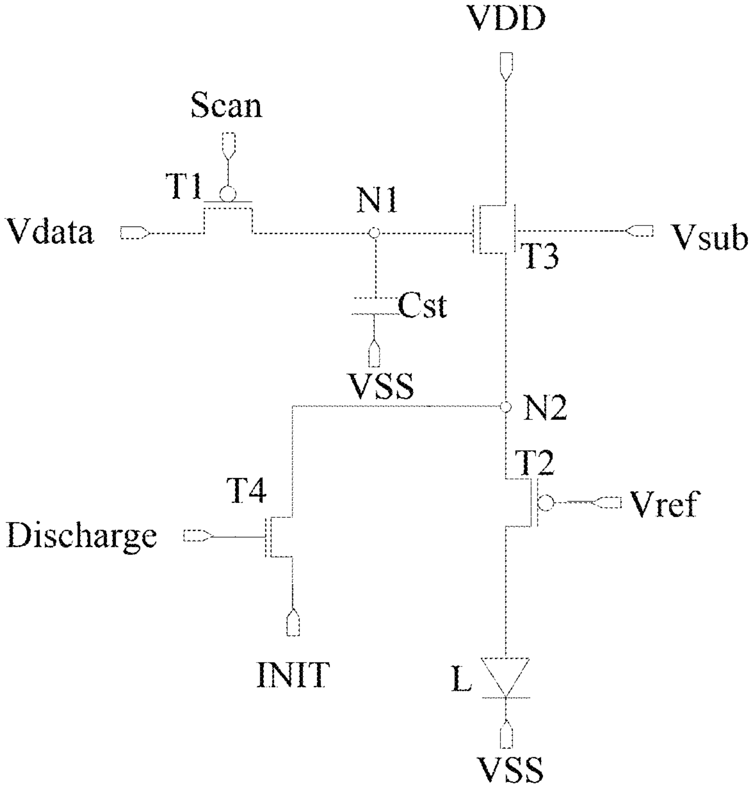
FIG. 3 is a first schematic circuit diagram of a pixel circuit in an exemplary embodiment of the present disclosure.

In an exemplary embodiment, taking the input sub-circuit including the first transistor T1, the drive sub-circuit including the third transistor T3, and the transmission sub-circuit including the second transistor T2 as an example, as shown in FIG. 3, the control electrode of the first transistor T1 is connected to the scan signal line Scan, the first electrode of the first transistor T1 is connected to the data signal line Vdata, the second electrode of the first transistor T1 is connected to the first node N1, and the first transistor T1 is configured to supply the signal of the data signal line Vdata to the third transistor T3 under the control of the signal of the scan signal line Scan. The control electrode of the third transistor T3 is connected to the first node N1 (that is, the first control electrode of the third transistor T3 is connected to the first electrode plate of the storage capacitor Cst), the substrate terminal of the third transistor T3 is connected to the third power supply line Vsub, the first electrode of the third transistor T3 is connected to the first power line VDD, and the second electrode of the third transistor T3 is connected to the second node N2 (that is, the second electrode of the third transistor T3 is connected to the first electrode of the second transistor T2). The control electrode of the second transistor T2 is connected to the reference signal line Vref, the first electrode of the second transistor T2 is connected to the second node N2 (i.e., the first electrode of the second transistor T2 is connected to the second electrode of the third transistor T3), and the second electrode of the second transistor T2 is connected to the first electrode (e.g., anode) of the light emitting element L; a second electrode (e.g. a cathode) of the light emitting element L is connected to a second power supply line VSS.

In an exemplary embodiment, taking the storage sub-circuit including the storage capacitor Cst as an example, the pixel circuit may further include the storage capacitor Cst. The storage capacitor Cst may include a first electrode plate and a second electrode plate arranged oppositely, wherein the first electrode plate of the storage capacitor Cst is connected to the first node N1, and the second electrode plate of the storage capacitor Cst is connected to the second power line VSS.

For example, the first transistor T1, the second transistor T2, the third transistor T3, and the storage capacitor Cst may be formed in an region corresponding to the display region of the display substrate.

In an exemplary embodiment, the pixel circuit may further include a reset sub-circuit connected to the discharge signal line Discharge, the second node N2, and the initial signal line INIT, and is configured to provide the signal of the initial signal line INIT to the second node N2 under the control of the signal of the discharge signal line Discharge.

For example, the reset sub-circuit may include a fourth transistor T4, still as shown in FIG. 3, the control electrode of the fourth transistor T4 is connected to the discharge signal line Discharge, the first electrode of the fourth transistor T4 is connected to the second node N2, and the second electrode of the fourth transistor T4 is connected to the initial signal line INIT. For example, the fourth transistor T4 may be formed in a region corresponding to the non-display region of the display substrate.

In one exemplary embodiment, the first node N1 and the second node N2 do not necessarily represent components that must actually be present, but rather represent the meeting point of the relevant electrical connections in the circuit diagram.

In an exemplary embodiment, the first transistor is configured to connect the data signal line Vdata to the storage capacitor Cst and supply the signal of the data signal line Vdata to the third transistor T3 under the control of the signal of the scan signal line Scan. The second transistor T2 is configured to supply a signal of the second node N2 to a first electrode of the light emitting element L under the control of a signal of a reference signal line Vref. The third transistor T3 is configured to supply the signal of the first power supply line VDD to the second node N2 under the control of the signal of the data signal line Vdata to drive the light emitting element L to emit light. The fourth transistor T4 is configured to supply the signal of the initial signal line INIT to the second node N2 under the control of the signal of the discharge signal line Discharge.

In an exemplary embodiment, the first power supply line VDD may continuously provide a high-level signal.

In an exemplary embodiment, the second power supply line VSS may continuously provide a low-level signal. For example, the second power supply line VSS may provide a zero voltage or a ground voltage.

In an exemplary embodiment, the third power supply line Vsub may continuously provide a low level signal or may provide a variable voltage signal. For example, the third power supply line Vsub may provide a zero voltage or a ground voltage. For example, the third power supply line Vsub may provide a variable voltage signal of 0V to 5V.

In an exemplary embodiment, the initial signal line INIT may continuously provide a reset voltage signal, which may be a zero voltage or a ground voltage, or may be another fixed level, such as a low voltage, etc., which is not limited by the embodiments of the present disclosure.

In an exemplary embodiment, the light emitting element may include any one of an OLED, a QLED, and an inorganic light emitting diode. For example, the light emitting element L may employ a micron-scale light emitting element, such as a Micro Light-Emitting Diode (Micro LED), a Mini Light-Emitting Diode (Mini LED), a Micro Organic Light Emitting Diode (Micro OLED), and the like, which are not limited by the embodiments of the present disclosure.

In an exemplary embodiment, the storage capacitor Cst may be a capacitor device manufactured by a process, for example, a capacitor device implemented by manufacturing specialized capacitor electrodes, and a plurality of capacitor electrodes of the capacitor may be manufactured by a metal layer, a semiconductor layer (e.g. doped polysilicon) or the like. Alternatively, the storage capacitor Cst may be a parasitic capacitance between a plurality of devices and may be achieved by the transistor itself and other devices or lines. The connection mode of the storage capacitor Cst includes but is not limited to the mode described above and may be other suitable connection modes as long as the level of the corresponding node may be stored. The illustrative embodiment of the disclosure does not limit this.

For example, the first transistor T1 and the second transistor T2 may be P-type Metal Oxide Semiconductor (PMOS) transistors, and the third transistor T3 and the fourth transistor T4 may be N-type Metal Oxide Semiconductor (NMOS) transistors.

Figure 4A:
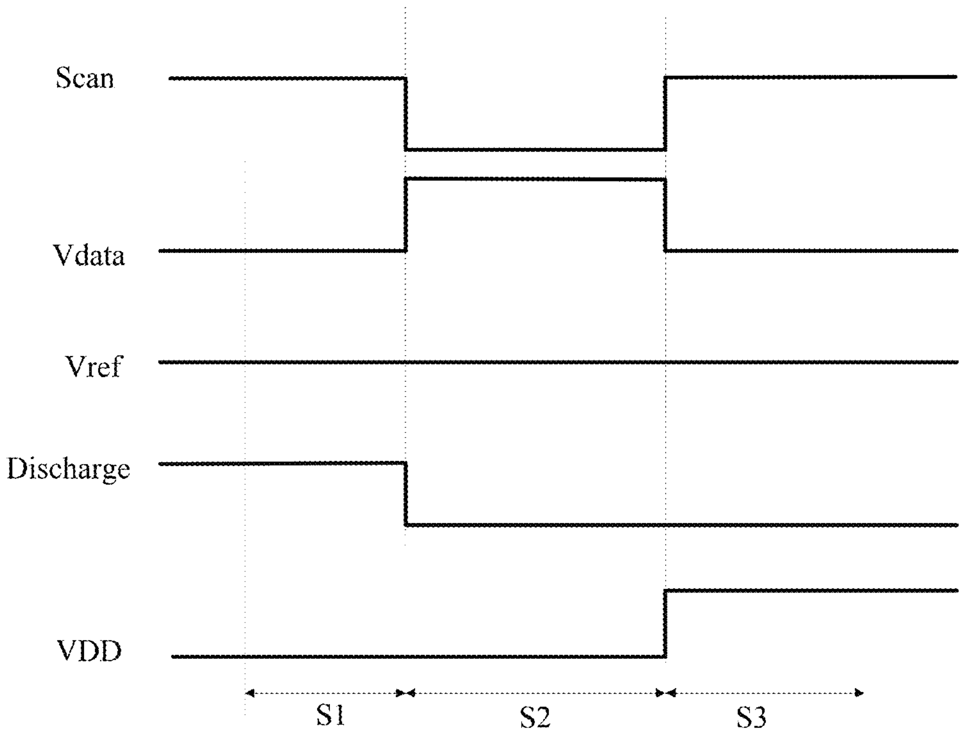
FIG. 4A is a signal sequence chart of a pixel circuit in an exemplary embodiment of the present disclosure.
Figure 4B:
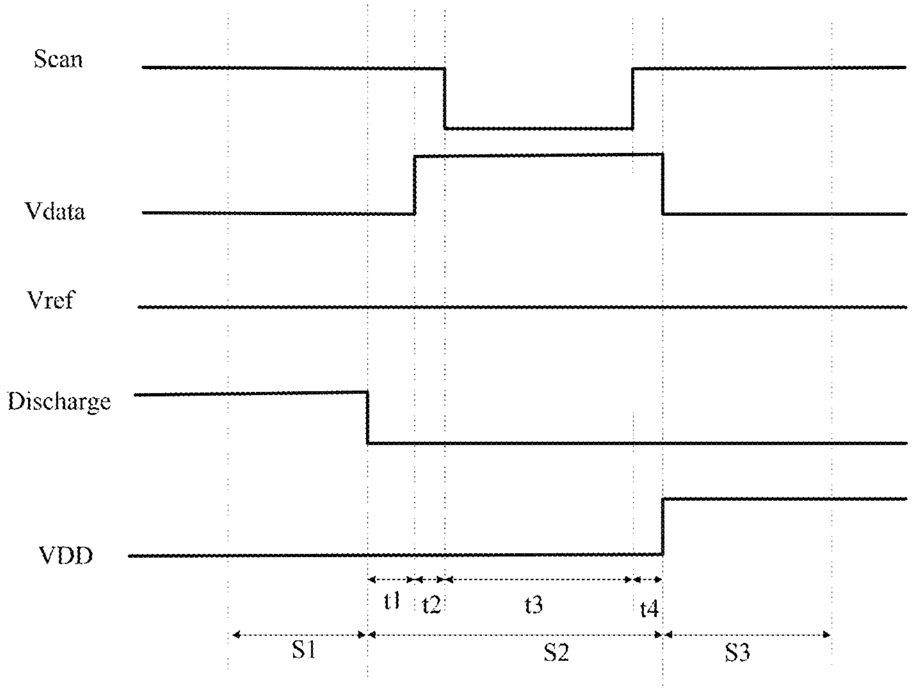
FIG. 4B is another signal sequence chart of the pixel circuit in the exemplary embodiment of the present disclosure.

FIG. 4A is a signal sequence chart of a pixel circuit in an exemplary embodiment of the present disclosure. FIG. 4B is another signal sequence chart of the pixel circuit in the exemplary embodiment of the present disclosure. The operation process of the pixel circuit provided by the exemplary embodiment of the present disclosure will be described below with reference to the circuit configuration shown in FIG. 3 in conjunction with the signal sequence charts shown in FIGS. 4A and 4B. Wherein, the levels of potentials of the signal sequence charts shown in FIGS. 4A and 4B are only schematic and do not represent true potential values or relative proportion. Corresponding to the embodiment of the present disclosure, the low-level signal corresponds to the ON signal of the P-type transistor, while the high-level signal corresponds to the OFF signal of the P-type transistor.

For example, as shown in FIG. 4A, the operation process of the pixel circuit provided by the exemplary embodiment of the present disclosure may include three stages, respectively a first stage S1, a second stage S2, and a third stage S3, in which the timing waveforms of a plurality of signal lines (scan signal line Scan, data signal line Vdata, reference signal line Vref, discharge signal line Discharge, and first power supply line VDD) in each stage are shown.

In an exemplary embodiment, the operation of a pixel circuit in an embodiment of the present disclosure may include:

a first stage S1, which may be referred to as a reset stage or an initialization stage.

At this stage, as shown in FIG. 4A, the signal of the scan signal line Scan in the first stage S1 is a high-level signal, the signal of the data signal line Vdata in the first stage S1 is a low-level signal, the signal of the reference signal line Vref in the first stage S1 is a low-level signal, the signal of the discharge signal line Discharge in the first stage S1 is a high-level signal, and the signal of the first power supply line VDD in the first stage S1 is a low-level signal.

In this stage, because the signal of the discharge signal line Discharge in the first stage S1 is a high-level signal, the N-type fourth transistor T4 is turned on, and therefore the signal of the initial signal line INIT is supplied to the second node N2 through the turned-on fourth transistor T4. Because the signal of the reference signal line Vref in the first stage S1 is a low-level signal, the P-type second transistor T2 is turned on. Because the fourth transistor T4 is turned on and the second transistor T2 is turned on, the signal output by the initial signal line INIT is provided to the first electrode of the OLED through the conductive fourth transistor T4, the second node N2 and the conductive second transistor T2, and the OLED is initialized (or called reset), and the first electrode of the OLED is pulled to a zero potential, so that the charge stored in the first electrode of the OLED may be quickly discharged (emptied) to ensure that the OLED does not emit light, thus achieving better dynamic contrast. The signal of the scan signal line Scan in the first stage S1 is a high-level signal, so that the P-type first transistor T1 is turned off.

The second stage S2 may be called the data writing stage.

At this stage, as shown in FIG. 4A, the signal of the scan signal line Scan in the second stage S2 is a low-level signal, the signal of the data signal line Vdata in the second stage S2 is a high-level signal, the signal of the reference signal line Vref in the second stage S2 is a low-level signal, the signal of the discharge signal line Discharge in the second stage S2 is a low-level signal, and the signal of the first power supply line VDD in the second stage S2 is a low-level signal.

In this stage, because the scan signal output by the scan signal line Scan in the second stage S2 is a low-level signal, the P-type first transistor T1 is turned on. The signal of the data signal line Vdata is supplied to the first node N1 through the turned-on first transistor T1, and the storage capacitor Cst is charged so that the signal output by the data signal line Vdata is stored in the storage capacitor Cst. Because the signal of the data signal line Vdata passes through the first transistor T1 and the first node N1, the N-type third transistor T3 is turned on, and the control signal output by the reference signal line Vref in the second stage S2 is a low-level signal, so that the P-type second transistor T2 is turned on. Because the control signal output by the discharge signal line Discharge in the second stage S2 provides a low-level signal, the fourth transistor T4 of the N type is turned off.

The third stage S3 is referred to as an emitting stage.

At this stage, as shown in FIG. 4A, the signal of the scan signal line Scan in the third stage S3 is a high-level signal, the signal of the data signal line Vdata in the third stage S3 is a low-level signal, the signal of the reference signal line Vref in the third stage S3 is a low-level signal, the signal of the discharge signal line Discharge in the third stage S3 is a low-level signal, and the signal of the first power supply line VDD in the third stage S3 is a high-level signal.

At this stage, because the scan signal line Scan supplies a high-level signal at the third stage S3, the P-type first transistor T1 is turned off, whereby the storage capacitor Cst supplies the signal output by the data signal line Vdata stored by the storage capacitor Cst in the second stage S2 to the first node N1, and therefore the third transistor T3 of the N type is turned on under the control of the first node N1 (i.e., in the data writing stage S2, the signal output by the data signal line Vdata and stored by the storage capacitor Cst in the second stage S2,). Because the signal of the reference signal line Vref in the third stage S3 is a low-level signal, the P-type second transistor T2 is turned on. Therefore, because the third transistor T3 is turned on and the second transistor T2 is turned on, the high-level signal outputted by the first power supply line VDD is supplied to the first electrode of the OLED through the conductive third transistor T3, the second node N2, and the conductive second transistor T2, so that the OLED emits light under the action of the high-level signal supplied by the first power supply line VDD to the first electrode of the OLED and the low-level signal supplied by the second power supply line VSS to the second electrode of the OLED. The discharge signal line Discharge supplies a low-level signal in the third stage S3 so that the fourth transistor T4 of the N type is turned off.

In an exemplary embodiment, the data signal line Vdata may be delayed for a period of time to start providing a high-level signal in the second stage S2. For example, as shown in FIG. 4B, after the second stage S2 lasts for a period of time t1, the data signal line Vdata starts to supply a high-level signal and may continue to supply a high-level signal until the end of the fourth period t4 in the second stage S2.

In an exemplary embodiment, in the second stage S2, the scan signal line Scan may delay a period of time to start providing a low-level signal and end providing a low-level signal earlier. For example, after the second stage S2 continues for a period of time t1+t2, the scan signal line Scan starts to supply a low-level signal and continues to supply the low-level signal until the third time period t3 in the second stage S2 ends, and the high-level signal starts to be supplied at the fourth time period t4.

Of course, in addition to the above two exemplary operation sequences, other operation sequences may be set according to the actual operating scene of the pixel circuit which is not limited here by the embodiments of the present disclosure.

In an exemplary embodiment, when the level of the signal supplied by the data signal line Vdata is small, the gate-source voltage Vgs of the P-type second transistor T2 meets $Vgs \leq |Vth|$, where Vgs represents a gate-source voltage difference of the second transistor T2 (for example, a voltage difference between the gate electrode and the first electrode of the second transistor T2), and Vth represents a threshold voltage of the second transistor T2, so that the current flowing through the light emitting element L may be smaller and a higher contrast may be achieved. For example, when the signal supplied by the data signal line Vdata is a 0 gray scale, the current flowing through the light emitting element L may be small, so that the luminance of the 0 gray scale is low and a high contrast may be achieved.

In an exemplary embodiment, because a second electrode (e.g. a cathode) of the light emitting element L is connected to a second power supply line VSS, the signal provided by the second power line VSS is a low-voltage signal (eg, a negative voltage, which can be generated by a related circuit module), therefore, the voltage Vcom of the second electrode (eg, cathode) of the light-emitting element L is caused to be a low-voltage signal (eg, a negative voltage). Then, when there is a short circuit between the second electrode (e.g. cathode) of the light emitting element L and the first electrode (e.g. anode) of the light emitting element L, if there is no P-type second transistor T2, the voltage of the second node N2 will be pulled down, so that the first electrode (for example, as a source) of the fourth transistor T4 will be pulled to a negative voltage, resulting in the parasitic PN junction of the fourth transistor T4 being in a forward bias state, which will cause a latch-up effect and lead to further failure or damage of the circuit. And when the P-type second transistor T2 is introduced, when a short circuit occurs between the second electrode (e.g. cathode) of the light emitting element L and the first electrode (e.g. anode) of the light emitting element L, the parasitic PN junction of the second electrode (e.g. as a drain) of the P-type second transistor T2 may be in a reverse bias state, thereby not causing a latch-up effect, which may prevent further failure or damage of the circuit caused by the latch-up effect. Therefore, the pixel circuit in the exemplary embodiment of the present disclosure can prevent the occurrence of defects in the entire display region due to the occurrence of cathode and anode short circuits of individual pixels.

Here, forward bias means that the gate-source voltage difference of the fourth transistor T4 is greater than the threshold voltage of the fourth transistor T4, and at this time, the fourth transistor T4 is turned on to transmit the driving circuit. Reverse bias means that the gate-source voltage difference of the second transistor T2 is less than 0, at which time the fourth transistor T4 is turned off.

In an exemplary embodiment, by selecting an appropriate voltage of the reference signal line Vref, the second transistor T2 may be enabled to function as a clamp, thereby the display contrast may be improved. For example, when a higher gray scale is displayed (e.g., the display gray scale is larger than the preset value G0 and smaller than the highest gray scale Gmax), the second transistor T2 has a higher degree of turning on under the control of the voltages of the reference signal line Vref and the second terminal of the third transistor T3, so that the light emitting element L can have a higher luminance. For example, when a lower gray scale is displayed (e.g., the display gray scale is smaller than the preset value G0 and larger than the lowest gray scale Gmax), the second transistor T2 has a lower degree of turning on under the control of the voltages of the reference signal line Vref and the second terminal of the third transistor T3, so that the light emitting element L can have a lower light luminance. For example, when the lowest gray scale is displayed, the second transistor T2 has an extremely low degree of turning on (for example, close to an off state) under the control of the voltages of the reference signal line Vref and the second terminal of the third transistor T3, so that the light emitting element L substantially does not emit light.

In an exemplary embodiment, during the driving process of the pixel circuit, the driving current flowing through the third transistor T3 (also referred to as a driving transistor) is determined by the voltage difference between the control electrode of the third transistor T3 and the first electrode of the third transistor T3. The driving current of the third transistor T3 is:

$$I=K^*(Vgs-Vth)2=K^*[(Vdd-V\text{data})-Vth]2$$

Herein, I is a driving current flowing through the third transistor T3, that is, a driving current for driving the OLED, K is a constant, Vgs is a voltage difference between the gate electrode and the first electrode (such as source electrode) of the third transistor T3, Vth is a threshold voltage of the third transistor T3, Vdata may represent both the data signal line and the level of the signal provided by the data signal line, and Vdd represents the voltage of the signal output by the first power supply line VDD.

Figure 5:
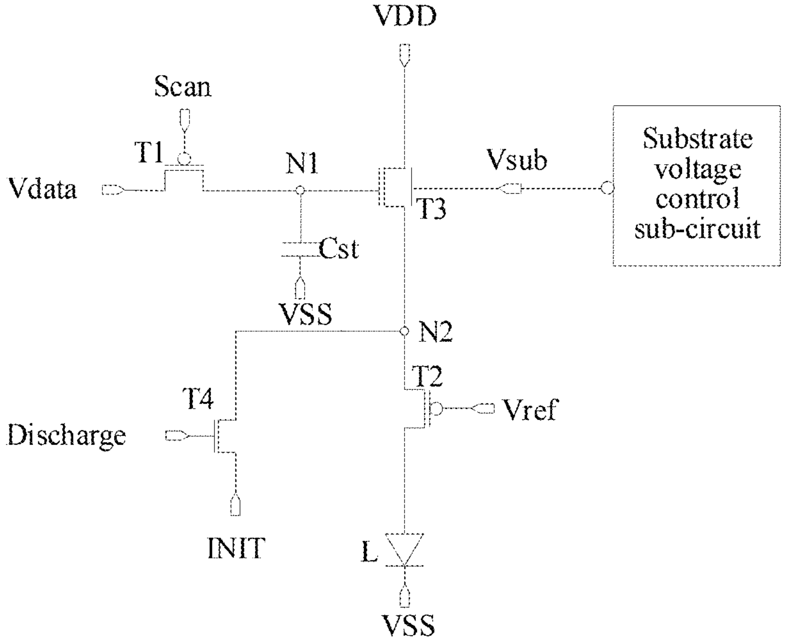
FIG. 5 is a second schematic circuit diagram of a pixel circuit in an exemplary embodiment of the present disclosure.

In an exemplary embodiment, as shown in FIG. 5, the pixel circuit may further include a substrate voltage control sub-circuit connected to the substrate terminal of the third transistor T3 through the third power supply line Vsub, and is configured to apply a voltage corresponding to the display mode to the substrate terminal of the third transistor T3 according to the display mode. For example, the display mode may include a high-brightness mode having a brightness parameter higher than a preset brightness threshold and a low-brightness mode having a brightness parameter not higher than a preset brightness threshold. Then, the substrate voltage control sub-circuit may be configured to apply a first voltage to the substrate terminals of six third transistors T3 in each repeating unit in a high-brightness mode, or to apply a second voltage to the substrate terminals of six third transistors T3 in each repeating unit in a low high-brightness mode, wherein the absolute value of the first voltage is greater than the absolute value of the second voltage. Thus, by increasing the voltage at the substrate terminal of the third transistor T3 by the substrate voltage control sub-circuit 900 in the high-brightness mode, the threshold voltage of the third transistor T3 may be reduced, the threshold loss of the maximum cross-voltage of the light emitting element L may be reduced, and the highlight display may be facilitated. For example, a substrate voltage control sub-circuit may be formed in a region corresponding to a non-display region of the display substrate.

In an exemplary embodiment, the second voltage may be a zero voltage.

In an exemplary embodiment, the substrate voltage control sub-circuit may include a low dropout linear regulator (LDO). The output of the LDO is connected to a third power supply line Vsub and a power supply. Thus, the LDO can supply a variable voltage to the substrate terminal of the third transistor T3 through the third power supply line Vsub.

In an exemplary embodiment, the voltage of the first electrode (e.g. anode) of the light emitting element L is controlled by the signal of the data signal line Vdata, and the voltage drop of the second transistor T2 may be ignored when the pixel circuit displays a high gray scale, and the voltage of the first electrode (e.g. anode) of the light emitting element L is Vdata-$V_{GSN2}$. Thus, when the light emitting element L emits light, the cross voltage of the light emitting element L is Vdata-$V_{GSN2}$-Vcom, where Vcom denotes the voltage of the second electrode of the light emitting element L, Vdata denotes both the data signal line and the level of the signal supplied by the data signal line, and $V_{GSN2}$ denotes the threshold voltage (also the Vth voltage) of the second transistor T2.

In an exemplary embodiment, the voltage of the signal supplied by the third power supply line Vsub to which the substrate terminal of the third transistor T3 is connected is adjustable. For example, the third power supply line Vsub provides a ground voltage (i.e. the level Vsub of the signal provided by the third power supply line Vsub meets Vsub=0V), that is, the substrate terminal of the third transistor T3 is grounded. When the voltage of the second electrode (e.g. cathode) of the light emitting element L meets Vcom=−7.5V, the voltage of the signal supplied by the data signal line Vdata may be 8.0 V to 0V, the effective range of the Gamma voltage is 8V to 1V, and the dropout voltage is 7V. At this time, the voltage of the first electrode (e.g. anode) of the light emitting element L is about 5.0 V at most, so that the cross-voltage of the light emitting element L can reach 12.5 V at most, and thus the driving for the OLED display device may be achieved. As another example, when the level Vsub of the signal supplied by the third power supply line meets Vsub=5V, that is, the substrate terminal of the third transistor T3 is at 5V. Under such conditions, when the voltage Vcom of the second electrode (e.g. cathode) of the light emitting element L meets Vcom=−7.5V, the voltage of the signal supplied by the data signal line Vdata may be 8.0 V to 0V, the effective range of the Gamma voltage is 8V to 5V, and the dropout voltage is 3V. At this time, the voltage of the first electrode (e.g. anode) of the light emitting element L is about 6.4 V at most, so that the cross-voltage of the light emitting element L can reach 13.9 V at most, so that the brightness of the OLED may be maximized and the high-brightness mode may be achieved.

In an exemplary embodiment, a substrate voltage control sub-circuit includes, for example, an LDO, an output terminal of which is connected to a third power supply line Vsub, a substrate terminal of the third transistor T3 is connected to the third power supply line Vsub, that is, a substrate terminal of the third transistor T3 is connected to an LDO, the voltage of which may be adjustable between 0V and 5V, and driving of a highlight OLED device may be achieved. Moreover, because the substrate terminal of the third transistor T3 is connected with the LDO, the matching and compatibility of OLED devices with different cross-voltage highlights may be achieved by changing the voltage of the LDO.

In an exemplary embodiment, in a case where the target display gray scale of the light emitting element L is larger than the preset value G0 (i.e., the target display gray scale is between G0 and Gmax, and Gmax is the highest gray scale), the voltage of the signal output by the third power supply line Vsub may be increased to reduce the threshold voltage of the third transistor T3, thereby reducing the threshold loss of the maximum cross-voltage of the light emitting element L (such as an OLED device) and facilitating the realization of highlighting.

Figure 6:
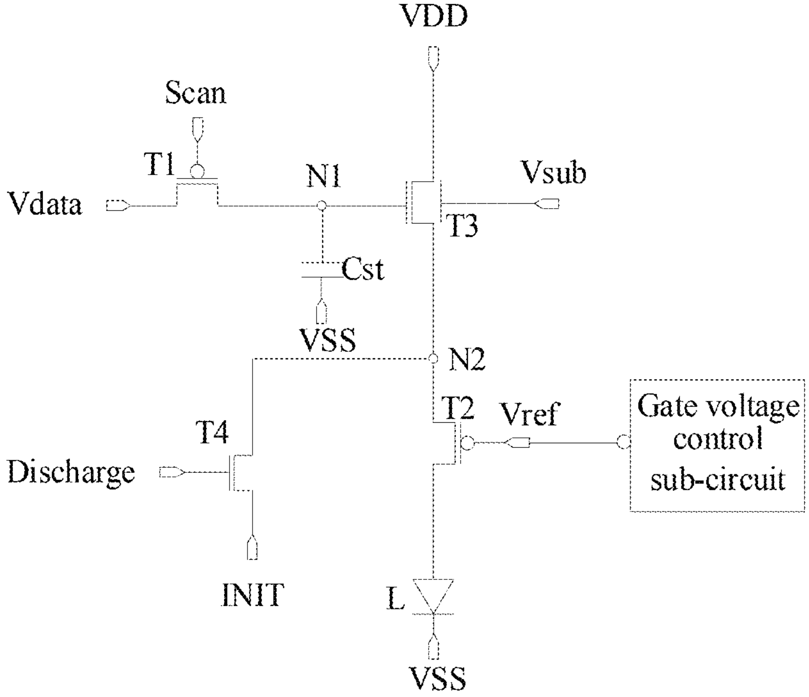
FIG. 6 is a third schematic circuit diagram of a pixel circuit in an exemplary embodiment of the present disclosure.

In an exemplary embodiment, as shown in FIG. 6 each pixel circuit may further include a gate voltage control sub-circuit connected to the reference signal line Vref. In each repeating unit, the control electrodes of six first transistors T1 in the first transistor column are connected and are connected to the gate voltage control sub-circuit. Control electrodes of six second transistors T2 in the second transistor column are connected and are connected to a gate voltage control sub-circuit. The gate voltage control sub-circuit is configured to supply a variable voltage to one or more of the control electrodes of the six first transistors T1 and the control electrodes of the six second transistors T2 in each repeating unit. For example, a gate voltage control sub-circuit may be formed in a region corresponding to a non-display region of the display substrate.

Thus, both the control electrode of the first transistor T1 and the control electrode of the second transistor T2 are connected to the reference signal line Vref, the gate voltage control sub-circuit is connected to the reference signal line Vref, that is, the control electrode of the first transistor T1 and the control electrode of the second transistor T2 are connected to the gate voltage control sub-circuit. Thus, through the gate voltage control sub-circuit supplying variable voltages to the control electrode of the first transistor T1 and the control electrode of the second transistor T2, so that a sufficient value range of the signal of the data signal line Vdata may be ensured, the contrast may be improved, the driving for the highlight OLED device may be achieved, and the PPI of the OLED may be improved.

In an exemplary embodiment, the gate voltage control sub-circuit may include an LDO whose output is connected to a reference signal line Vref and a power supply. Thus, the LDO can supply variable voltages to the control electrode of the first transistor T1 and the control electrode of the second transistor T2 through the reference signal line Vref.

In an exemplary embodiment, the control electrode of the first transistor T1 is connected to an LDO, and the voltage is variable, whereby a sufficient value range of the signal of the data signal line Vdata may be guaranteed. For example, the voltage supplied by the LDO may be −2.5V, i.e. the voltage of the signal of the reference signal line Vref may be −2.5V, and the voltage of the signal of the data signal line Vdata may reach a maximum of 5.5 V under the condition that the normal operation of the display device is ensured. At this time, the voltage of the signal of the data signal line Vdata is high, so that the gray scale segmentation may be relatively fine and the transition may be relatively smooth under the low gray scale. In addition, the control electrode of the P-type first transistor T1 is connected to an LDO to ensure the value range of the signal of the data signal line Vdata, so that the use of the P-type MOS transistor (also known as PMOS transistor) may be reduced. Compared with the transmission gate switch formed by the P-type MOS transistor and the N-type MOS transistor (also known as NMOS transistor) in some technologies, the PPI may be maximized under a limited pixel region.

In the highly integrated and miniaturized silicon-based OLED display device, in order to achieve the minimum mechanism size matching and achieve the miniaturization of the OLED display device, in the pixel circuit structure with NMOS transistor as the driving transistor in some technologies, by connecting a positive voltage to the substrate terminal of the NMOS transistor, and applying a positive voltage to the anode of the OLED through the forward-biased parasitic PN junction, negative voltage is applied to the cathode to achieve the light emitting of the entire OLED, but this structure is not suitable for the pixel circuit structure with the OLED anode and the PMOS transistor.

Figure 7:
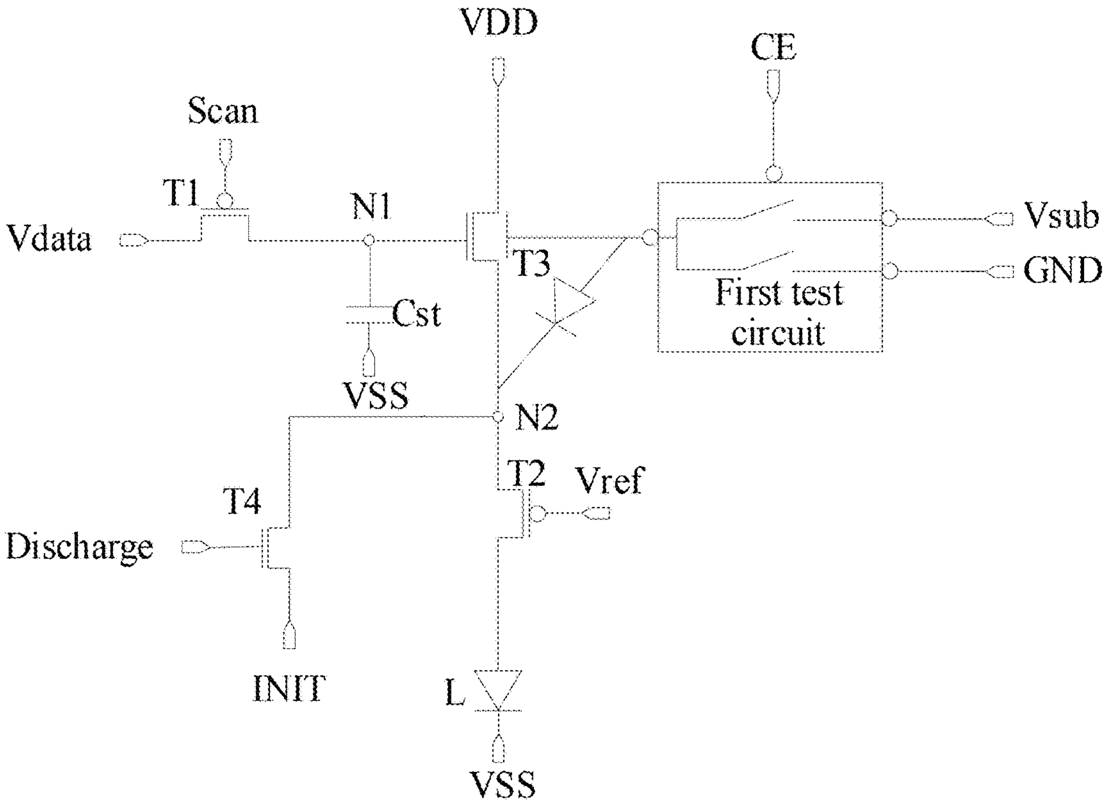
FIG. 7 is a fourth schematic circuit diagram of a pixel circuit in an exemplary embodiment of the present disclosure.

In an exemplary embodiment, as shown in FIG. 7, the pixel circuit may further include a first test circuit connected to a test enable signal line CE, a third transistor T3, a third power supply line Vsub, and a fourth power supply line GND and is configured to, under the control of the signal of the test enable signal line CE, switch a connection state of the third transistor T3 from a first connection state to a second connection state, supply a fixed voltage output by the fourth power supply line GND to the third transistor T3, and control the third transistor T3 to be in a forward bias state; wherein, the first connection state is that the substrate terminal of the third transistor T3 is connected to the third power supply line, and the second connection state is that the substrate terminal of the third transistor T3 is connected to the fourth power supply line GNND; and the second transistor T2 is configured to, under the control of the signal of the reference signal line Vref, supply a fixed voltage output by the fourth power supply line GND to the first electrode of the light emitting element, to cause the light emitting element to emit light. In this way, the two-point test is achieved by switching the connection state of the third transistor T3, which can eliminate the lighting modes of all driving circuits, clarify the problems between the backplane and the light emitting element (such as OLED), facilitate the verification of the anode uniformity of the light emitting element (such as OLED), and improve the yield of products. For example, the first test circuit may be formed in a region corresponding to a non-display region of the display substrate.

For example, the substrate terminal of the third transistor T3 is switched to be connected to the third power supply line Vsub when normally displayed.

For example, when entering AOI (Automatic Optic Inspection) mode, the AOI_EN pin is pulled high to provide an electrical signal to the test enable signal line CE to enter the AOI-1 mode. Thus, under the control of the signal of the test enable signal line CE, the substrate terminal of the third transistor T3 is switched to be connected to the fourth power supply line GND. At this time, there is a parasitic diode (also referred to as a PN junction) between the substrate terminal and the second electrode (for example, as a source) of the third transistor T3. When a positive voltage is applied to the fourth power supply line GND, the parasitic diode of the third transistor T3 (for example, an NMOS transistor) will be turned on, and a negative voltage is applied to the reference signal line Vref so that the second transistor T2 (for example, a PMOS transistor) is turned on. In this way, the positive voltage of the fourth power supply line GND may be transmitted to the first electrode of the light emitting element L (for example, the OLED anode) by the forward bias parasitic diode. At this time, the current flows from the pin of the fourth power supply line GND through the parasitic diode to the second transistor T2 (for example, a PMOS transistor), then it flows down to the first electrode (e.g. OLED anode) of the light emitting element L to enable the light emitting element L to emit light without passing through the upper third transistor T3 (e.g. NMOS transistor). That is, it is equivalent to directly applying voltage between the anode and cathode of the light emitting element L (e.g. OLED), so as to achieve lighting the light emitting element L by simple two-point pressurization. Therefore, through the first test circuit, the lighting mode of the drive sub-circuit (i.e., the third transistor T3) in the pixel circuit may be eliminated, the problems existing in the backplane and the light emitting element L (such as the OLED) may be clarified quickly, and the defects may be located quickly. Moreover, in this lighting mode, the luminous uniformity of the light emitting element L (such as OLED) is related to the process uniformity of the anode, so that it is convenient to verify the anode uniformity of the light emitting element (such as OLED), improve the yield of the product, and play an important role in the test and analysis of the silicon-based OLED display.

In an exemplary embodiment, as shown in FIG. 7 the first test circuit may include a first switch device and a second switch device; a first terminal of the first switch device is connected to a substrate terminal of the third transistor T3, and a second terminal of the first switch device is connected to a third power supply line Vsub; a first terminal of the second switch device is connected to the substrate terminal of the third transistor T3, and a second terminal of the second switch device is connected to the fourth power supply line GND; the first test circuit is configured to, under the control of a signal of a test enable signal line CE, switch the first switch device from an on state to an off state and switch the second switch device from an off state to an on state. In this way, the third transistor T3 (i.e., the driving transistor) is connected to the switch device controlled by the signal (i.e., the control signal as the switch) of the test enable signal line CE, so that the voltage of the substrate terminal of the third transistor T3 (i.e., the driving transistor) may be switched between the voltage of the signal of the third power supply line Vsub and the voltage of the signal of the fourth power supply line GND. In this way, when the second switch device is switched on, the substrate terminal of the third transistor T3 is switched to be connected to the fourth power supply line GND, a positive voltage is applied to the fourth power supply line GND, a negative voltage is applied to the reference signal line Vref so that the second transistor T2 (for example, a PMOS transistor) is turned on. At this time, the positive voltage supplied by the fourth power supply line GND may be transmitted to the first electrode of the light emitting element (for example, the OLED anode) by the forward bias parasitic diode. It can eliminate the lighting mode of pixel circuit, clarify the problems between backplane and light-emitting elements (such as OLED), verify the uniformity of anode of light-emitting elements (such as OLED) conveniently, improve the yield of products, and play an important role in the test and analysis of silicon-based OLED display.

In the highly integrated and miniaturized silicon-based OLED display device, in order to achieve the minimum mechanism size matching and achieve the miniaturization of the OLED display device, in the pixel circuit structure with NMOS transistor as the driving transistor in some technologies, the OLED cannot be lit in monochrome, and it is not suitable for the pixel circuit structure with PMOS transistor and the anode of OLED.

Figure 8A:
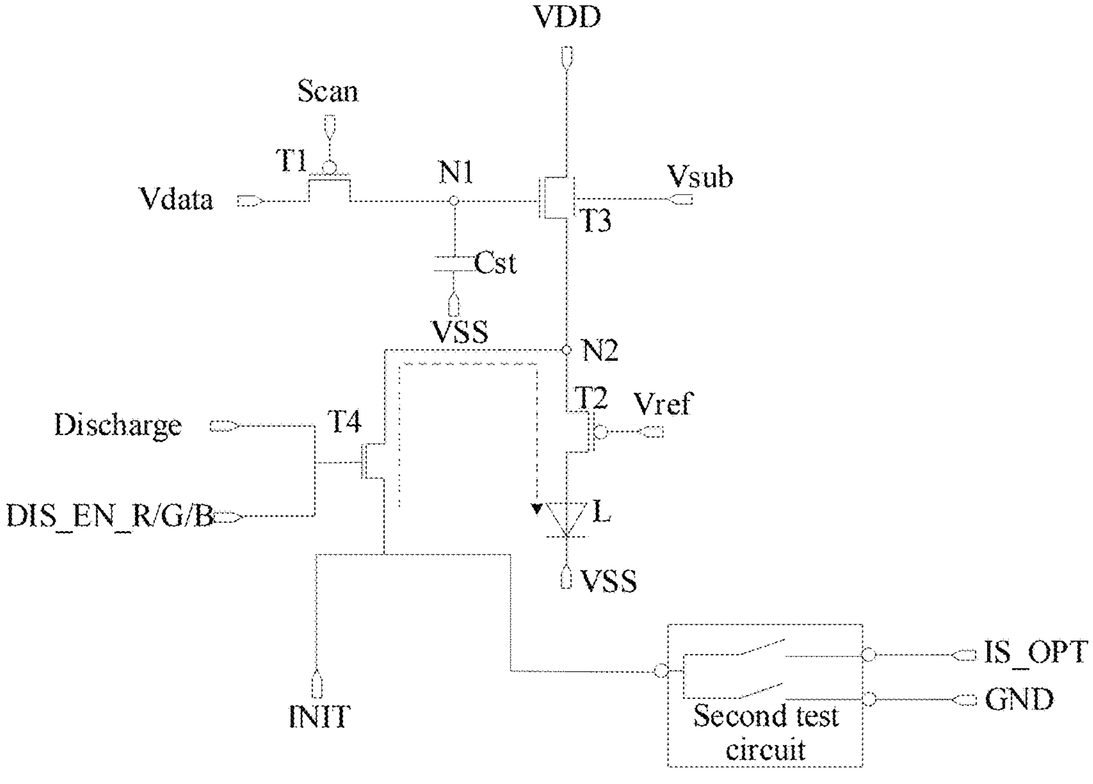
FIG. 8A is a fifth schematic circuit diagram of a pixel circuit in an exemplary embodiment of the present disclosure.

FIG. 8A is a fifth schematic diagram of a pixel circuit of a display substrate of an exemplary embodiment of the present disclosure. FIG. 8A takes the example where the first color is red, the second color is green, and the third color is blue. As shown in FIG. 8A, the pixel circuit may further include a second test circuit. Wherein, a control electrode of the fourth transistor T4 is connected to the monochrome enable signal line DIS_EN_R/G/B, and the fourth transistor T4 is further configured to, under the control of the signal of the monochrome enable signal line DIS_EN_R/G/B, control a light emitting element L connected to the monochrome enable signal line DIS_EN_R/G/B to emit a monochrome light ray corresponding to the signal of the monochrome enable signal line DIS_EN_R/G/B. The monochrome enable signal line DIS_EN_R/G/B includes a first enable signal line connected to a red light emitting element DIS_EN_R, a second enable signal line connected to a green light emitting element DIS_EN_G, and a third enable signal line connected to a blue light emitting element DIS_EN_B. The second test circuit is connected to a fourth transistor T4, a switch signal line, a monochrome test signal line IS_OPT, and a fourth power supply line GND, and is configured to, under the control of a signal of the switch signal line, switch a connection state of a fourth transistor T4 between a third connection state and a fourth connection state, and to supply a signal of the monochrome test signal line IS_OPT or a signal of the fourth power supply line GND to the fourth transistor T4; wherein, the third connection state is that the second electrode of the fourth transistor T4 is connected to the monochrome test signal line IS_OPT, and the fourth connection state is that the second electrode of the fourth transistor T4 is connected to the fourth power supply line GND. Thus, the monochrome enable signal line DIS_EN_R/G/B is connected the control electrode of the fourth transistor T4, so that the fourth transistor T4 may be switched and connected to the monochrome test signal line IS_OPT or the fourth power supply line GND, to achieve monochrome two-point test, which can eliminate the lighting modes of all driving circuits, clarify the problems between the backplane and the light emitting element (such as OLED), facilitate the verification of the anode uniformity of the light emitting element (such as OLED), and improve the yield of products.

For example, the second test circuit may be formed in a region corresponding to a non-display region of the display substrate.

For example, the second electrode of the fourth transistor T4 is connected to the monochrome test signal line IS_OPT when entering the monochrome test mode of the AOI mode. A positive voltage is applied to the monochrome test signal line IS_OPT, and a negative voltage is applied to the reference signal line Vref so that the second transistor T2 (for example, a PMOS transistor) is turned on. At this time, the positive voltage of the monochrome test signal line IS_OPT may be transmitted to the first electrode of the light emitting element (e.g., OLED anode) to make it emit light without passing through the upper third transistor T3 (e.g., NMOS transistor). That is, it is equivalent to directly applying voltage between the anode and cathode of the light emitting element L (e.g. OLED), so as to achieve lighting the light emitting element L by simple two-point pressurization. Therefore, through the second test circuit, the monochrome lighting mode of the drive sub-circuit (i.e., the third transistor T3) in the pixel circuit may be eliminated, the problems existing in the backplane and the light emitting element L (such as the OLED) may be clarified quickly. Moreover, in this lighting mode, the luminous uniformity of the light emitting element L (such as OLED) is related to the process uniformity of the anode, so that it is convenient to verify whether the anode of the light emitting element (such as OLED) has adhesion and uniformity, improve the yield of the product, and play an important role in the test and analysis of the silicon-based OLED display.

Figure 8B:
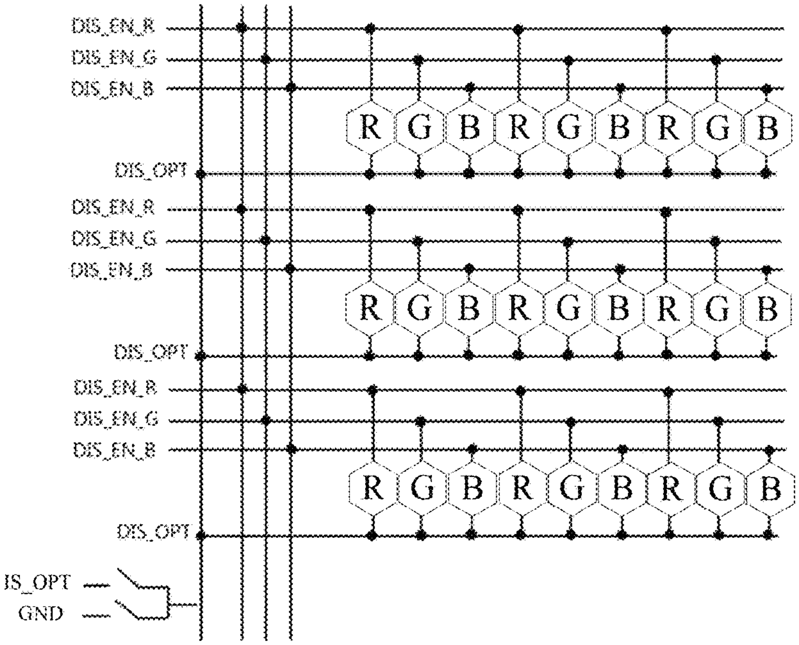
FIG. 8B is a schematic diagram of a signal line and a light emitting element of the pixel circuit shown in FIG. 8A.

For example, as shown in FIG. 8B, the control electrode of the fourth transistor T4 is switched to connect the first enable signal line DIS_EN_R to control the upper terminals of all light emitting elements L (for example, as R sub-pixels) that emit red rays, the control electrode of the fourth transistor T4 is switched to connect the second enable signal line DIS_EN_G to control the upper terminals of all light emitting elements L (for example, as G sub-pixels) that emit green light, and the control electrode of the fourth transistor T4 is switched to connect the third enable signal line DIS_EN_B to control the upper terminals of all light emitting elements L (for example, as B sub-pixels) that emit blue rays. The lower terminals of all the light emitting elements L (including RGB sub-pixels) may be connected together and further connected to the signal line DIS_OPT. The signal line DIS_OPT is connected to the switch signal outside the display region (also known as AA region), the signal line DIS_OPT is connected to a monochrome test signal line IS_OPT and a fourth power supply line GND respectively. The second electrode of the fourth transistor T4 is connected to the fourth power supply line GND when normal display is implemented, and the second electrode of the fourth transistor T4 is connected to the monochrome test signal line IS_OPT when lighting test of the monochrome RGB is implemented.

In an exemplary embodiment, the first color, the second color and the third color may be one of red, green and blue, and may be different from each other.

In an exemplary embodiment, as shown in FIG. 8A, the second test circuit may include a third switch device and a fourth switch device. A first terminal of the third switch device is connected to the second electrode of the fourth transistor T4, and a second terminal of the third switch device is connected to the monochrome test signal line IS_OPT; and a first terminal of the fourth switch device is connected to the second electrode of the fourth transistor T4, and a second terminal of the fourth switch device is connected to the fourth power supply line GND.

The following takes the example where the pixel circuits including a first transistor T1, a second transistor T2, a third transistor T3 and a storage capacitor, a repeating unit including six first transistors T1, six second transistors T2, and six third transistors T3, and the arrangement of transistors shown in FIG. 1B is taken example as an example, the layout of the display substrate provided by at least one embodiment of the present disclosure is illustrated in conjunction with the layout of the display substrate shown in FIG. 2. Among them, the embodiment of the present disclosure is described by taking the substrate as a silicon-based substrate as an example.

In some exemplary embodiments, in a direction perpendicular to the substrate, the display substrate may include: an active layer, a first conductive layer, a first insulating layer, a second conductive layer, a second insulating layer, a third conductive layer, a third insulating layer, a fourth conductive layer, a four insulating layers, a fifth conductive layer, a sixth conductive layer, a fifth insulating layer, a seventh conductive layer, a sixth insulating layer, and an eighth conductive layer. As use herein, “sequentially stacked arrangement” in embodiments of that present disclosure refer to active layers, the first conductive layer, the first insulating layer, the second conductive layer, the second insulating layer, the third conductive layer, the third insulating layer, the fourth conductive layer, the fourth insulating layer, the fifth conductive layer, the sixth conductive layer, the fifth insulating layer, the seventh conductive layer, the sixth insulating layer and the eighth conductive layer are stacked in a direction away from the substrate. But it doesn’t mean that these films must cling to each other pairwise.

In an exemplary embodiment, the substrate may be a rigid substrate such as a glass substrate or a silicon substrate or the like. Alternatively, the substrate may be formed of a flexible material having excellent heat resistance and durability, For example, polyimide (PI), polycarbonate (PC), polyethylene terephthalate (PET), polyethylene, polyacrylate, polyaryl compound, polyetherimide, polyethersulfone, polyethylene glycol terephthalate (PET), polyethylene (PE), polypropylene (PP), polysulfone (PSF), polymethyl methacrylate (PMMA), cellulose triacetate (TAC), cyclic olefin polymer (COP) or cyclic olefin copolymer (COC), etc. Embodiments of the present disclosure are described by taking the substrate as a silicon substrate as an example, however, embodiments of the present disclosure are not limited thereto.

In an exemplary embodiment, the substrate may include monocrystalline silicon or high purity silicon. A pixel circuit is formed on a substrate by a CMOS semiconductor process. For example, an active region of a transistor (including a channel region, a first region, and a second region of the transistor) is formed in a substrate by a doping process, and a plurality of insulating layers are formed by a silicon oxidation process or a chemical vapor deposition process (CVD), and a plurality of conductive layers are formed by a sputtering process to form a trace structure, etc. Active regions of the plurality of transistors are located inside the substrate.

Hereinafter, the structure of the display substrate will be described hierarchically by taking the first transistor T1 and the second transistor T2 as P-type transistors and the third transistor T3 as N-type transistors in the pixel circuit in the display region as an example.

A process for preparing a display substrate of the present exemplary embodiment may include following actions.

(1) Forming an active layer and a first conductive layer on a substrate.

In some exemplary embodiments, a silicon-based substrate is provided, for example, its material is P-type monocrystalline silicon. For example, an N-type transistor (such as the third transistor T3) can be directly manufactured on the P-type silicon substrate, that is, the P-type silicon substrate acts as the channel region of the N-type transistor, which is beneficial to the high-speed performance of the NMOS device, and improves circuit performance. For example, N-type doping is performed on a P-type silicon substrate to form an N-type well region to serve as a substrate of P-type transistors (eg, the first transistor T1 and the second transistor T2).

In an exemplary embodiment, a gate insulating layer is formed on the above-mentioned substrate, and then a first conductive layer is formed on the gate insulating layer through a patterning process. For example, a gate insulating layer is formed on the substrate by a thermal oxidation method, and the material of the gate insulating layer can be nitride, oxide or oxynitride of silicon. Then, a first conductive material layer is formed on the gate insulating layer by a chemical vapor deposition process (PVD), and a photolithography process is performed on the first conductive material layer to form a first conductive layer. A material of the first conductive layer may be polysilicon material, and the first conductive layer may be referred to as a polysilicon layer.

In an exemplary embodiment, the N-type doping process may be, for example, an ion implantation process, and the doping element may be, for example, boron. The P-type doping process may be, for example, an ion implantation process, and the doping element may be, for example, phosphorus.

In an exemplary embodiment, N-type doping and P-type doping may be performed respectively during the doping process. For example, the first region and the second region of an N-type transistor and the first region and the second region of a P-type transistor are taken as examples. When the N-type doping process is performed, a barrier layer may be formed to shield a region that is not N-type doped; and when the P-type doping process is performed, a barrier layer may be formed to shield a region that is not P-type doped.

In an exemplary embodiment, during a doping process, such as using an ion implantation process, a pattern of a first conductive layer (e.g., a polysilicon layer) may act as a mask such that ion implantation to a silicon-based substrate occurs just on both sides of the polysilicon, thereby forming first region and second region of a plurality of transistors, enabling self-alignment. In addition, the resistivity of polysilicon with high resistance originally is reduced by doping process, which can form the control electrodes of a plurality of transistors. Therefore, using polysilicon material as the control electrode material of a plurality of transistors has various beneficial effects and saves the process cost.

Figure 9:
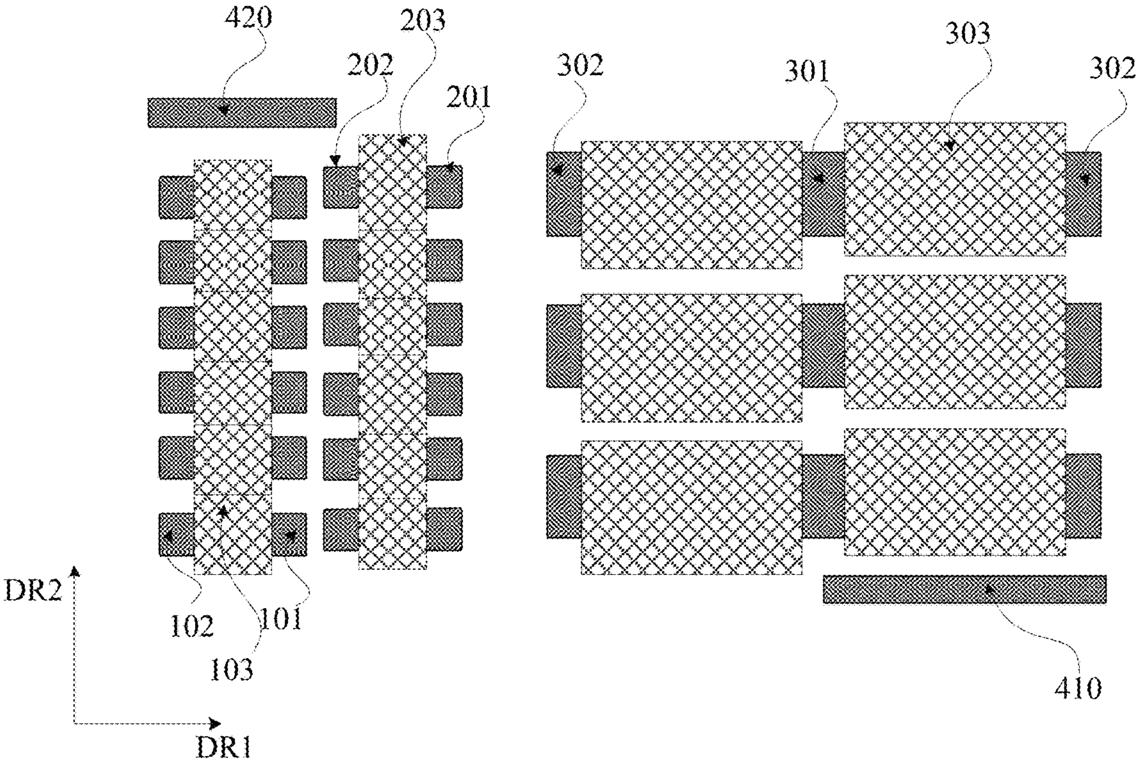
FIG. 9 is a schematic diagram of structures of an active layer and a first conductive layer in a display substrate of an exemplary embodiment of the present disclosure.

In an exemplary embodiment, FIG. 9 is a schematic diagram of structures of an active layer and a first conductive layer in a display substrate of an exemplary embodiment of the present disclosure. As shown in FIG. 9, the active layer may include an active region of a first transistor T1, an active region of a second transistor T2, an active region of a third transistor T3, a first contact region 410 in a P-type substrate, and a second contact region 420 in an N-type well region. For example, the active region of the first transistor T1, the active region of the second transistor T2, and the active region of the third transistor T3 extend along the first direction DR1. For example, the active region of the first transistor T1 and the active region of the second transistor T2 are arranged on the same side of the active region of the third transistor T3 along the second direction DR2.

In an exemplary embodiment, as shown in FIG. 9, the active region of the first transistor T1 may include a first region 101 and a second region 102 located on both sides of the active region of the first transistor T1, and a channel (not shown in the figure) located between the first region 101 and the second region 102; the active region of the second transistor T2 may include a first region 201 and a second region 202 located on both sides of the active region of the second transistor T2 respectively, and a channel (not shown in the figure) located between the first region 201 and the second region 202; the active region of the third transistor T3 may include a first region 301 and a second region 302 located on both sides of the active region of the third transistor T3 respectively, and a channel (not shown in the figure) located between the first region 301 and the second region 302.

In an exemplary embodiment, as shown in FIG. 9, the active regions of the plurality of first transistors T1 and the active regions of the plurality of second transistors T2 may be located in the same doped region (P-type well region) in each repeating unit. Therefore, compared with providing independent well regions respectively, this arrangement can make the arrangement of pixels more compact on the premise of satisfying design rules, which is helpful to improve the resolution of the display substrate.

In an exemplary embodiment, as shown in FIG. 9, in each repeating unit, in the first direction DR1, the active regions of two adjacent third transistors T3 may be an integral structure connected to each other. That is, the active regions of the two third transistors T3 are located in the same doped region (N-type well region), and the first regions of the two third transistors T3 are connected to each other in an integrated structure, so that the first electrodes of the two third transistors T3 are connected to each other in an integrated structure to receive signals provided by the same first power supply line VDD. Thus, with this arrangement, the active regions of two adjacent third transistors T3 may be formed in the same composition process, thereby saving the process, reducing the production cost, reducing the total area occupied by the third transistor T3 in the pixel region, and is beneficial to reducing the area of the pixel region, thereby achieving high resolution of the display product.

Here, an "integral structure" in embodiments of the present disclosure may refer to a structure formed by two (or more) structures which are formed by the same deposition process and are patterned by the same composition process so as to connect to each other, and their materials may be the same or different.

In an exemplary embodiment, as shown in FIG. 9, the area of the active region of the third transistor T3 is larger than the area of the active region of other transistors (e.g., at least one of the first transistor T1 and the second transistor T2), and accordingly a larger aspect ratio may be obtained, which helps to improve the driving capability of the third transistor T3, thereby improving the display effect.

In an exemplary embodiment, as shown in FIG. 9, the active layer may include a first contact region 410 and a second contact region 420, wherein the first contact region 410 and the second contact region 420 are different types of doped regions. For example, the first contact region 410 is a P-type heavily doped region (P+). For example, the first contact region 410 is used to bias the P-type substrate where the third transistor T3 is located, thereby avoiding the threshold voltage change caused by parasitic effects such as substrate bias effect and improving the stability of the circuit. For example, the second contact region 420 is an N-type heavily doped region (N+). For example, the second contact region 420 is used to bias the N-type well region where the third transistor T3 is located, thereby avoiding the threshold voltage change caused by parasitic effects such as substrate bias effect and improving the stability of the circuit. For example, by arranging a first contact region 410 to be connected to a fourth power supply line GND (or a third power supply line Vsub), the second contact region 420 to be connected to the fifth power supply line AVDD, so that the P-type substrate may be biased at low voltage and the N-type well region may be biased at high voltage. In this way, the parasitic PN junction between the P-type substrate and the N-type well region may be reverse biased, the device may be electrically isolated, the parasitic effect between the devices may be reduced, and the stability of the circuit may be improved.

In an exemplary embodiment, as shown in FIG. 9, the first conductive layer may include a control electrode 103 of the first transistor T1, a control electrode 203 of the second transistor T2, and a control electrode 303 of the third transistor T3.

In an exemplary embodiment, as shown in FIG. 9, in each repeating unit, the control electrodes 103 of two adjacent first transistors T1 in the second direction DR2 may be an integral structure connected to each other. Therefore, compared with separate arrangement, this arrangement can make the arrangement of pixels more compact on the premise of satisfying design rules, which is helpful to improve the resolution of the display substrate.

In an exemplary embodiment, as shown in FIG. 9, in each repeating unit, the control electrodes 203 of two adjacent second transistors T2 in the second direction DR2 may be an integral structure connected to each other. Therefore, compared with separate arrangement, this arrangement can make the arrangement of pixels more compact on the premise of satisfying design rules, which is helpful to improve the resolution of the display substrate.

In an exemplary embodiment, among the plurality of repeating units, the control electrodes of corresponding transistors in two adjacent repeating units in the first direction DR1 are symmetrical with respect to the symmetry axis in the second direction, wherein, the second direction intersects the first direction. That is, the pattern of the first conductive layer (for example, the polysilicon layer) may be a symmetrical pattern. For example, the display substrate may include: a first repeating unit, a second repeating unit and a third repeating unit arranged in sequence in the first direction DR1, wherein the first repeating unit may include: a first transistor column, a second transistor column and a third transistor array arranged in sequence in a first direction DR1, the second repeating unit may include: a third transistor array, a second transistor column and a first transistor column arranged in sequence in a first direction DR1, and the third repeating unit may include: a first transistor column, a second transistor column and a third transistor array arranged in sequence in a first direction DR1. Then, the control electrodes of the corresponding transistors in the first repeating unit and the second repeating unit may be symmetrical about a first symmetry axis along the second direction DR2. The control electrodes of the corresponding transistors in the second repeating unit and the third repeating unit may be symmetrical about a second symmetry axis along the second direction DR2. The second symmetry axis parallels to the first symmetry axis. This symmetrical arrangement can improve the uniformity of process error as much as possible, thus improving the uniformity of display substrate. In addition, this symmetrical arrangement enables some structures arranged in the same layer and connected to each other in the substrate to be formed integrally. Compared with separate arrangement, it can make the pixel layout more compact and improve the space utilization rate, thereby improving the resolution of the display substrate.

(2) Sequentially forming a first insulating layer and a second conductive layer on the substrate on which the aforementioned structure is formed.

Figure 10:
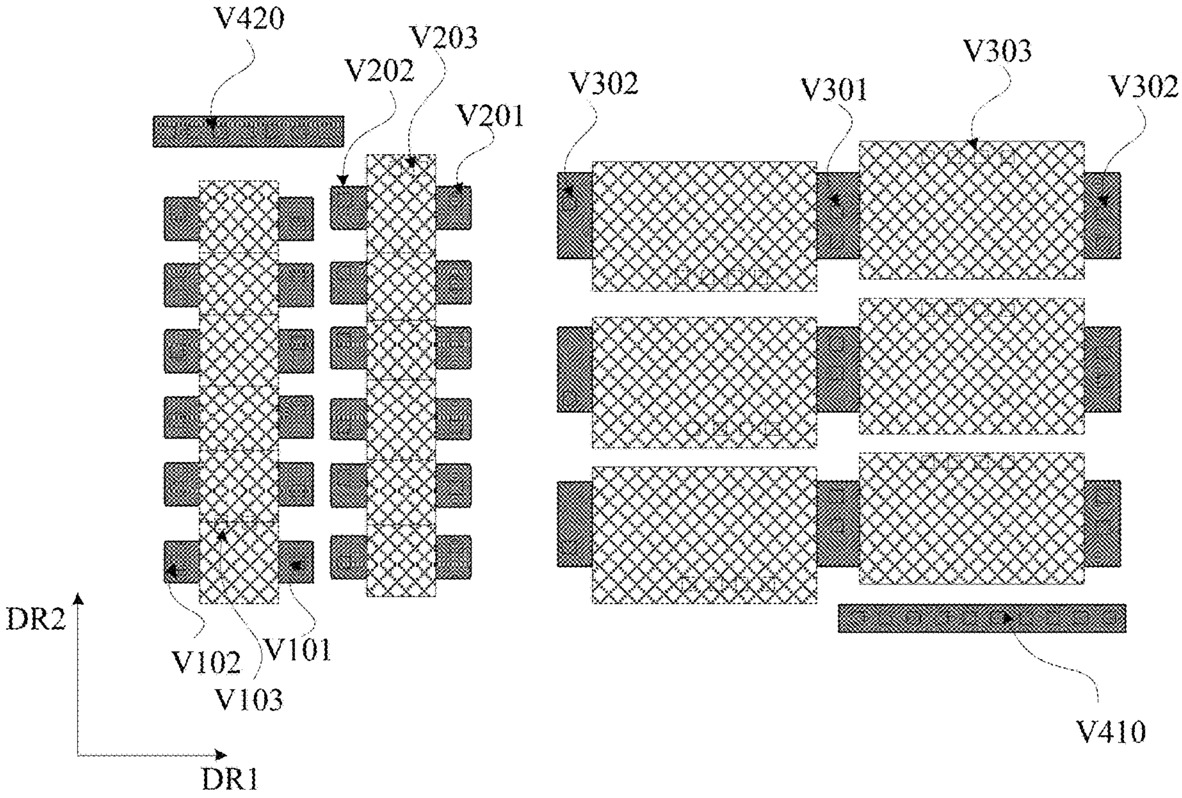
FIG. 10 is a schematic diagram of structures of an active layer, a first conductive layer, and a first insulating layer in a display substrate of an exemplary embodiment of the present disclosure.

In an exemplary embodiment, FIG. 10 is a schematic diagram of structures of an active layer, a first conductive layer, and a first insulating layer in a display substrate of an exemplary embodiment of the present disclosure. As shown in FIG. 10, a plurality of contact holes may be provided on the first insulating layer, and the plurality of contact holes may include a first contact hole V101, a second contact hole V102, a third contact hole V103, a fourth contact hole V201, a fifth contact hole V202, a sixth contact hole V203, a seventh contact hole V301, an eighth contact hole V302, a ninth contact hole V303, a tenth contact hole V410, and an eleventh contact hole V420. For example, the first insulating layer may also be referred to as a Contact (CT) layer.

For example, one or more of the third contact hole V103, the sixth contact hole V203, the seventh contact hole V301, the eighth contact hole V302, the ninth contact hole V303, the tenth contact hole V410, and the eleventh contact hole V420 may be provided as at least two to reduce the contact resistance.

In an exemplary embodiment, the material of the second conductive layer may be a metal material. The second conductive layer may also be referred to as a first metal (Metal 1) layer.

Figure 11:
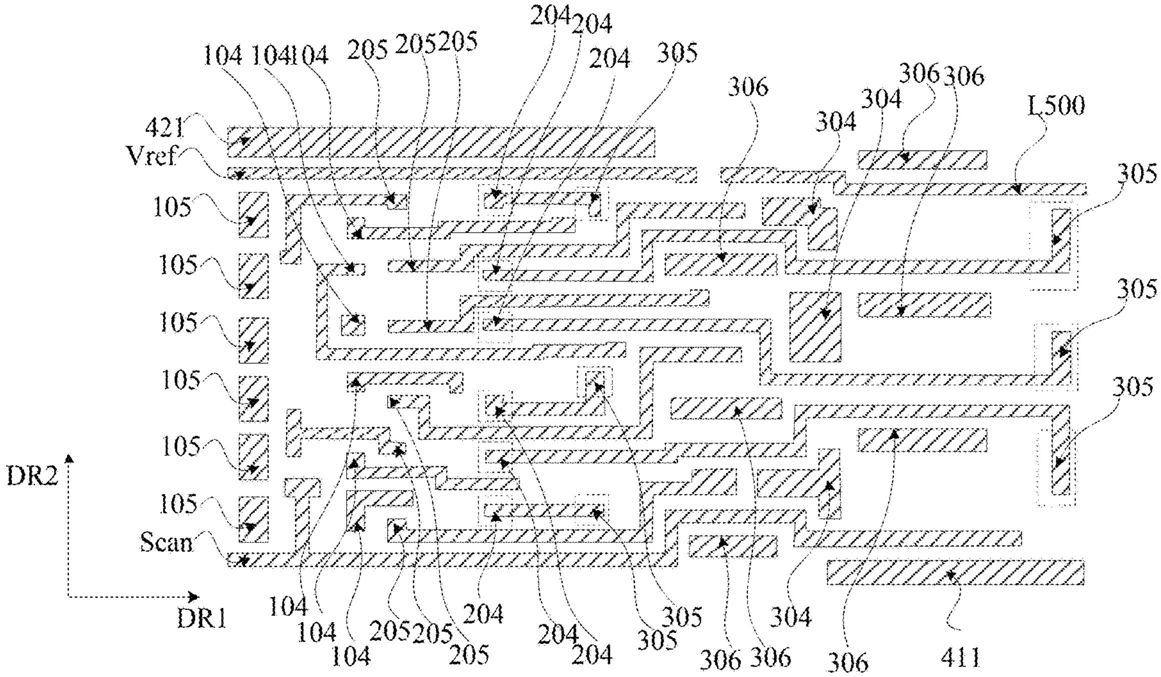
FIG. 11 is a schematic diagram of a structure of a second conductive layer in a display substrate according to an exemplary embodiment of the disclosure.

In an exemplary embodiment, FIG. 11 is a schematic diagram of a structure of a second conductive layer in a display substrate according to an exemplary embodiment of the disclosure. As shown in FIG. 11, the second conductive layer may include: a first electrode 104 of the first transistor T1, a second electrode 105 of the first transistor T1, a first electrode 204 of the second transistor T2, a second electrode 205 of the second transistor T2, a first electrode 304 of the third transistor T3, a second electrode 305 of the third transistor T3, a gate connection electrode 306, a scan signal line Scan, a reference signal line Vref, a first first connection line L500 (also referred to as a Vref connection line), a first second connection line 411, and a first third connection line 421.

In an exemplary embodiment, as shown in FIG. 11, the scan signal line Scan extends in the first direction DR1, the reference signal line Vref extends in the first direction DR1, and the scan signal line Scan is disposed in the same layer as the reference signal line Vref.

In an exemplary embodiment, as shown in FIG. 11, the first electrode 104 of the first transistor T1, the second electrode 105 of the first transistor T1, the first electrode 204 of the second transistor T2, the second electrode 205 of the second transistor T2, the first electrode 304 of the third transistor T3, the second electrode 305 of the third transistor T3, the scan signal line Scan, and the reference signal line Vref are arranged in the same layer.

Figure 12:
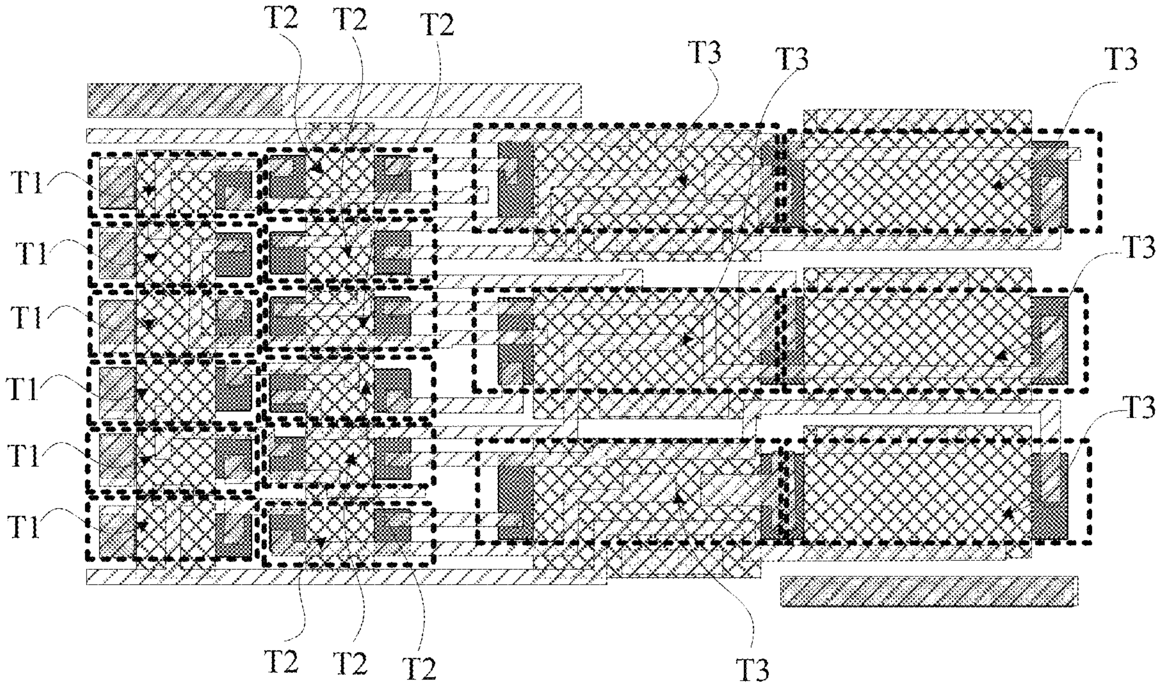
FIG. 12 is a schematic diagram of a structure after a second conductive layer is formed in an exemplary embodiment of the present disclosure.

In an exemplary embodiment, FIG. 12 is a schematic diagram of a structure after a second conductive layer is formed in an exemplary embodiment of the present disclosure. As shown in FIGS. 9 to 12, The first electrode 104 of the first transistor T1 is electrically connected to the first region 101 of the active region of the first transistor T1 through the first contact hole V101. The second electrode 105 of the first transistor T1 is electrically connected to the second region 102 of the active region of the first transistor T1 through the second contact hole V102. The first electrode 204 of the second transistor T2 is electrically connected to a first region 201 of an active region of the second transistor T2 through a fourth contact hole V201. The second electrode 205 of the second transistor T2 is electrically connected to a second region 202 of an active region of the second transistor T2 through a fifth contact hole V202. The first electrode 304 of the third transistor T3 is electrically connected to a first region 301 of an active region of the third transistor T3 through a seventh contact hole V301. The second electrode 305 of the third transistor T3 is electrically connected to a second region 302 of an active region of the third transistor T3 through an eighth contact hole V302. The gate connection electrode 306 is connected to the control electrode 303 of the third transistor T3 through a ninth contact hole V303.

In an exemplary embodiment, as shown in FIG. 11, in each repeating unit, the first electrodes 304 of two third transistors T3 adjacent in the first direction are an integral structure connected to each other. In this way, the manufacturing process may be simplified, the production cost may be reduced, the total area occupied by the third transistor T3 in the pixel region may be reduced, and the area of the pixel region may be reduced, thereby achieving high resolution of the display product.

In an exemplary embodiment, as shown in FIG. 11, in each repeating unit, the first electrode 204 of the second transistor T2 and the second electrode 305 of the third transistor T3 are arranged in the same layer and have an integrated structure connected to each other. In this way, the manufacturing process may be simplified, the production cost may be reduced, the arrangement of pixels may be more compact, the area of the pixel region may be reduced, and the resolution of the display substrate may be improved.

In an exemplary embodiment, as shown in FIGS. 9 to 12 the scan signal line Scan is connected to the control electrode 103 of the first transistor T1 through the third contact hole V103. For example, the scan signal line Scan extends in the first direction DR1.

In an exemplary embodiment, as shown in FIGS. 9 to 12, the reference signal line Vref is connected to the control electrode 203 of the second transistor T2 through the sixth contact hole V203. For example, the reference signal line Vref extends in the first direction DR1.

In an exemplary embodiment, as shown in FIGS. 9 to 12, in each repeating unit, the control electrodes 103 of a plurality of first transistors T1 are controlled by the same scan signal line Scan. Thus, it is helpful to save the layout area occupied by the scan signal line Scan, thereby improving the space utilization rate of the layout and improving the resolution of the display substrate.

In an exemplary embodiment, as shown in FIGS. 9 to 12, in each repeating unit, the control electrodes 203 of a plurality of second transistors T2 are controlled by the same reference signal line Vref. Thus, it is helpful to save the layout area occupied by the reference signal line Vref, thereby improving the space utilization rate of the layout and improving the resolution of the display substrate.

In an exemplary embodiment, as shown in FIGS. 9 to 12, the first first connection line L500 (also referred to as a Vref connection line) is connected to the reference signal line Vref through a connection line formed subsequently, enabling the reference signal line Vref to be led out for easy connection to the control electrode 203 of the second transistor T2 in another repeating unit.

In an exemplary embodiment, as shown in FIGS. 9 to 12, the first second connection lines 411 are connected to the first contact region 410 through a tenth contact hole V410, the first third connection lines 421 are connected to the second contact region 420 through the eleventh contact hole V420, so that the devices may be electrically isolated by performing low-voltage bias on the P-type substrate and high-voltage bias on the N-type well region, and the parasitic effect between devices may be reduced, thus improving the stability of the circuit.

(3) Sequentially forming a second insulating layer and a third conductive layer on the substrate on which the aforementioned structure is formed.

Figure 13:
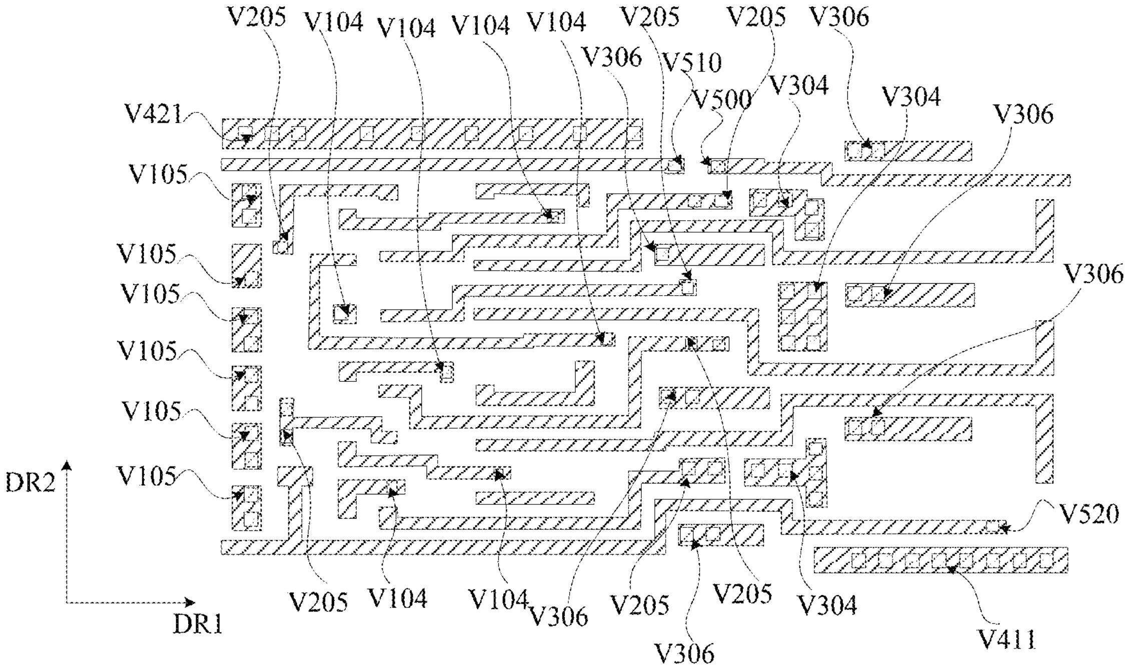
FIG. 13 is a schematic diagram of structures of a second conductive layer and a second in insulating layer in a display substrate in an exemplary embodiment of the present disclosure.

In an exemplary embodiment, FIG. 13 is a schematic diagram of structures of a second conductive layer and a second insulating layer in a display substrate in an exemplary embodiment of the present disclosure. As shown in FIG. 13, a plurality of vias may be provided on the second insulating layer, and the plurality of vias may include a first first via V104, a first second via V105, a first third via V205, a first fourth via V304, a first fifth via V306, a first sixth via V411, a first seventh via V421, a first eighth via V500, a first ninth via V510, and a first tenth via V520. For example, the second insulating layer may also be referred to as a first via layer (Via1).

In an exemplary embodiment, as shown in FIG. 13, one or more of the first second via V105, the first third via V205, the first fourth via V304, the first fifth via V306, the first sixth via V411, and the first seventh via V421 may be provided as at least two.

In an exemplary embodiment, the material of the third conductive layer may be a metal material. The third conductive layer may also be referred to as a second metal (Metal2) layer.

Figure 14:
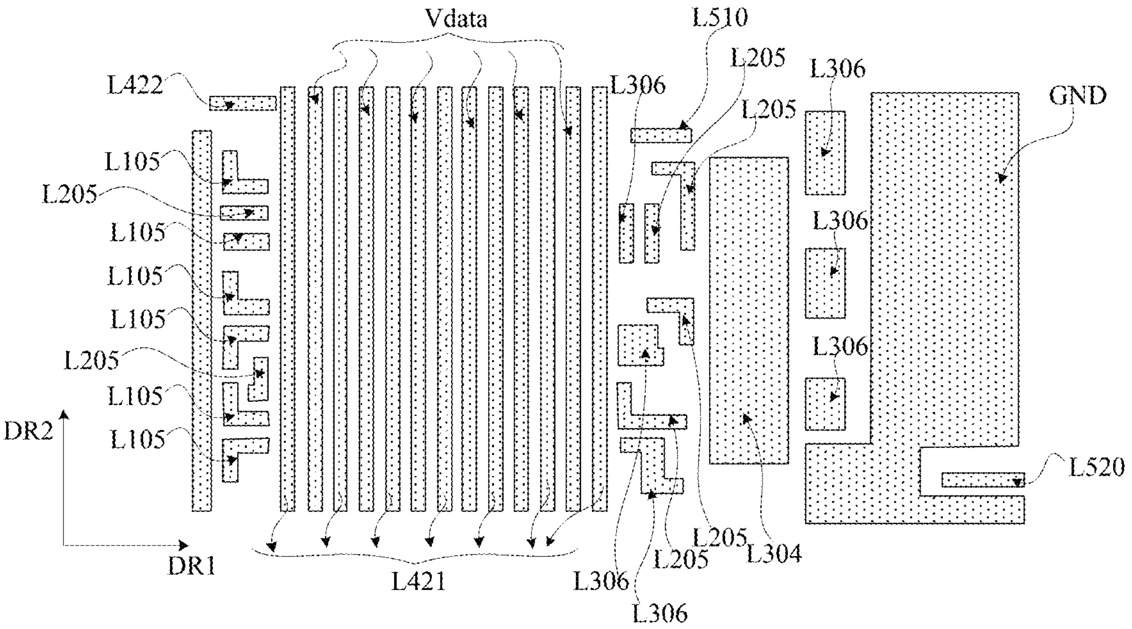
FIG. 14 is a schematic diagram of a structure of a third conductive layer in a display substrate of an exemplary embodiment of the present disclosure.

In an exemplary embodiment, FIG. 14 is a schematic diagram of a structure of a third conductive layer in a display substrate of an exemplary embodiment of the present disclosure. As shown in FIG. 14, the third conductive layer may include a data signal line Vdata, a fourth power supply line GND (also referred to as a ground line GND), a second first connection electrode L105, a second second connection electrode L205, a second third connection electrode L304, a second fourth connection electrode L306, a second first connection line L421, a second fifth connection electrode L422, a second sixth connection electrode L510, and a second seventh connection electrode L520. Here, taking that a signal is supplied to the substrate terminal of the NMOS transistor through the fourth power supply line GND as an example, that is, the third conductive layer may include a part of the third power supply line Vsub.

In an exemplary embodiment, as shown in FIG. 14, the data signal line Vdata extends in the second direction DR2.

In an exemplary embodiment, the film layer on which the data signal line Vdata extending in the second direction DR2 is located is between the film layer on which the scan signal line Scan extending in the first direction DR1 is located and the film layer on which the first power supply line VDD extending in the first direction DR1 is located.

In an exemplary embodiment, as shown in FIG. 14, the second first connection line L421 extends along the second direction DR2.

In an exemplary embodiment, as shown in FIG. 14, in each repeating unit, the data signal line Vdata is alternately arranged with the second first connection line L421 in the first direction DR1.

Figure 15:
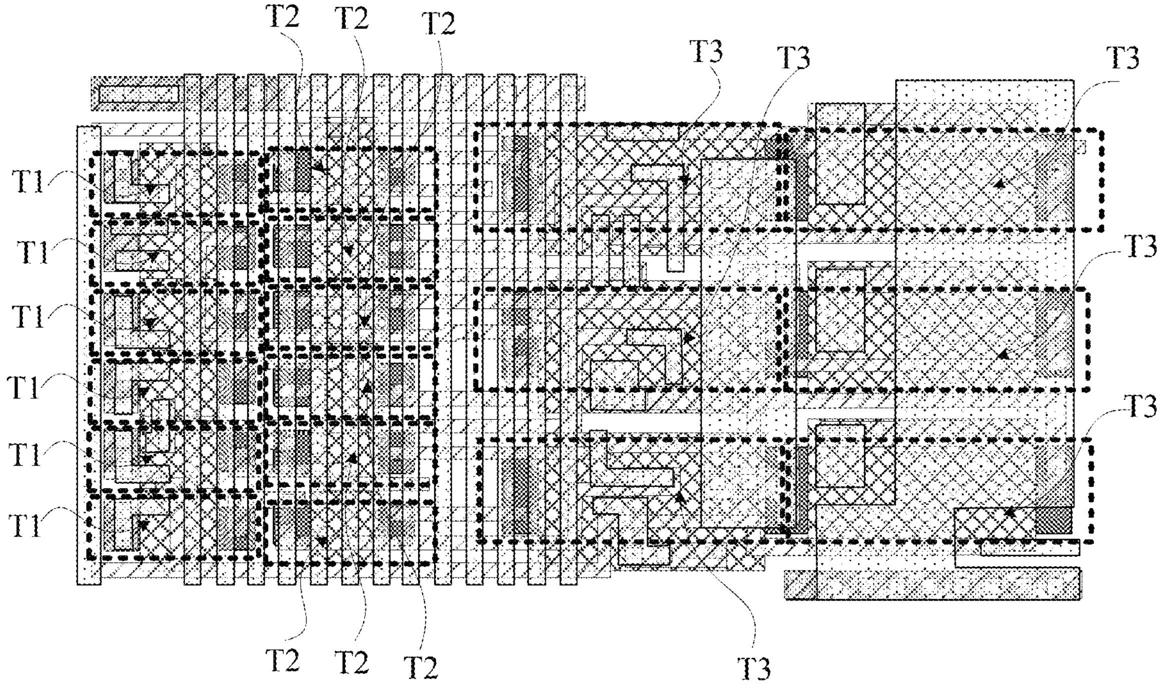
FIG. 15 is a schematic diagram after the third conductive layer is formed in an exemplary embodiment of the present disclosure.

In an exemplary embodiment, FIG. 15 is a schematic diagram after the third conductive layer is formed in an exemplary embodiment of the present disclosure. As shown in FIGS. 9 to 15, the data signal line Vdata is connected to the first electrode 104 of the first transistor T1 through the first first via V104.

In an exemplary embodiment, as shown in FIGS. 9 to 15, the fourth power supply line GND (also referred to as the ground line GND) is connected to the first second connection lines 411 through the first six vias V411. Thus, the fourth power supply line GND is connected to the first contact region 410 through the first sixth via V411, the first second connection line 411, and the tenth contact hole V410 in turn. Thus, a low-voltage bias of the P-type substrate may be achieved by supplying a low-level signal through the fourth power supply line GND. Furthermore, the stability of the circuit may be improved.

In an exemplary embodiment, as shown in FIGS. 9 to 15, the second first connection line L421 and the second fifth connection electrode L422 are connected to the first third connection line 421 through the first seventh via V421. Thus, the second first connection line L421 and the second fifth connection electrode L422 are connected to the second contact region 420 through the first seventh via V421, the first third connection line 421 and the eleventh contact hole V420 in turn, so that the N-type well region is subsequently biased at high voltage.

In an exemplary embodiment, as shown in FIGS. 9 to 15, the second first connection electrode L105 is connected to the second electrode 105 of the first transistor T1 through the first second via V105.

In an exemplary embodiment, as shown in FIGS. 9 to 15, the second second connection electrode L205 is connected to the second electrode 205 of the second transistor T2 through the first third via V205.

In an exemplary embodiment, as shown in FIGS. 9 to 15, the second third connection electrode L304 is connected to the first electrode 304 of the third transistor T3 through the first fourth via V304, so as to achieve connection of the first electrode 304 of the third transistor T3 to the first power supply line VDD which is subsequently formed.

In an exemplary embodiment, as shown in FIGS. 9 to 15, the second fourth connection electrode L306 is connected to the gate connection electrode 306 through a first fifth via V306.

In an exemplary embodiment, as shown in FIGS. 9 to 15, the second sixth connection electrode L510 passes through the first ninth via V510 and the reference signal line Vref, and passes through the first eighth via V500 and the first first connection line L500. Thus, the first connection line L500 is connected to the reference signal line Vref, so that the reference signal line Vref in one repeating unit may be led out to facilitate the connection of the control electrode 203 of the second transistor T2 in the other repeating unit.

In an exemplary embodiment, as shown in FIGS. 9-15, the second fifth connection electrode L520 is connected to the scan signal line Scan through the first tenth via V520. In this way, the scan signal line Scan in one repeating unit may be pulled out to facilitate the connection of the control electrode 103 of the first transistor T1 in the other repeating unit.

(4) Sequentially forming a third insulating layer and a fourth conductive layer on the substrate on which the aforementioned structure is formed.

Figure 16:
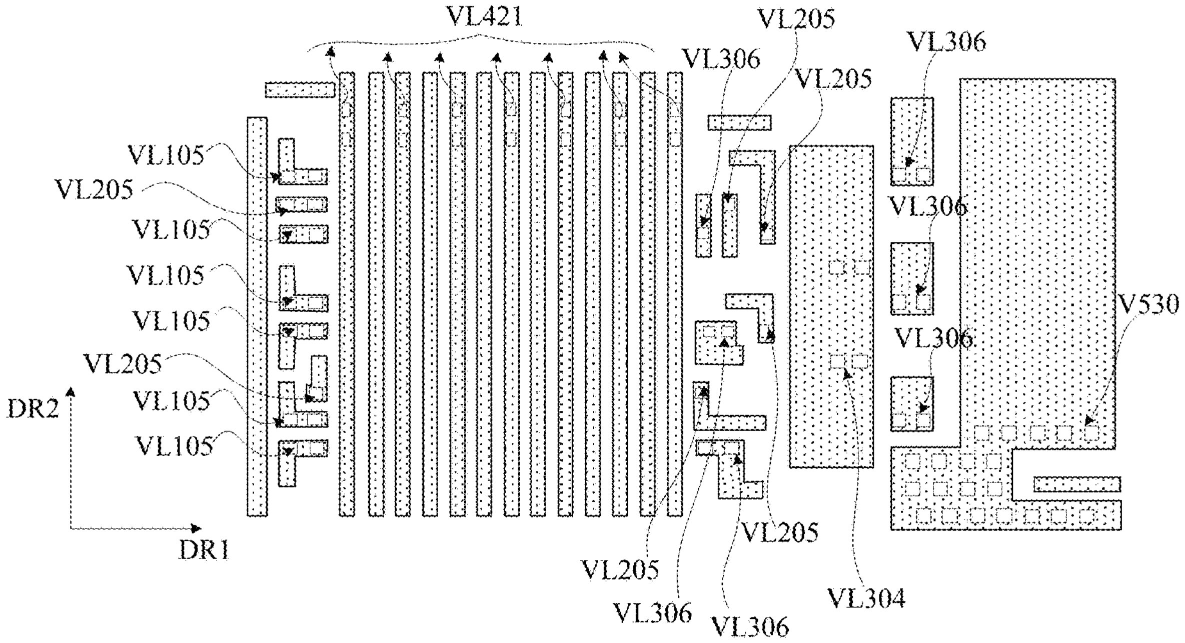
FIG. 16 is a schematic diagram of structures of a third conductive layer and a third insulating layer in a display substrate of an exemplary embodiment of the present disclosure.

In an exemplary embodiment, FIG. 16 is a schematic diagram of structures of a third conductive layer and a third insulating layer in a display substrate of an exemplary embodiment of the present disclosure. As shown in FIG. 16, a plurality of vias may be provided on the third insulating layer, and the plurality of vias may include a second first via VL105, a second second via VL205, a second third via VL304, a second fourth via VL306, a second fifth via VL421, and a second sixth via V530. For example, the third insulating layer may also be referred to as a second via (Via2) layer.

In an exemplary embodiment, as shown in FIG. 16, one or more of the second first via VL105, the second second via VL205, the second third via VL304, the second fourth via VL306, the second fifth via VL421, and the second sixth via V530 may be provided as at least two.

In an exemplary embodiment, the material of the fourth conductive layer may be a metal material. The fourth conductive layer 502 may also be referred to as a third (Metal3) metal layer.

Figure 17:
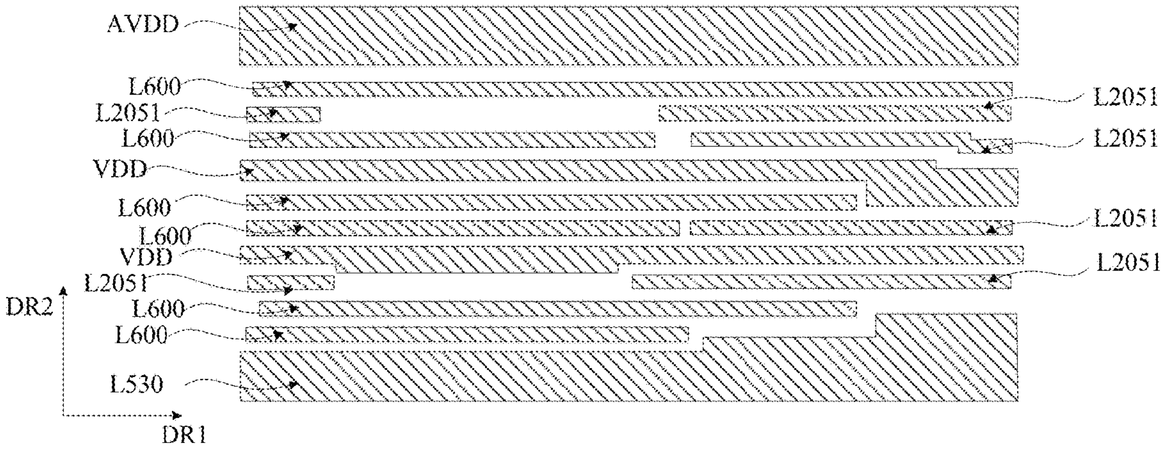
FIG. 17 is a schematic diagram of a structure of a fourth conductive layer in a display substrate of an exemplary embodiment of the present disclosure.
Figure 18:
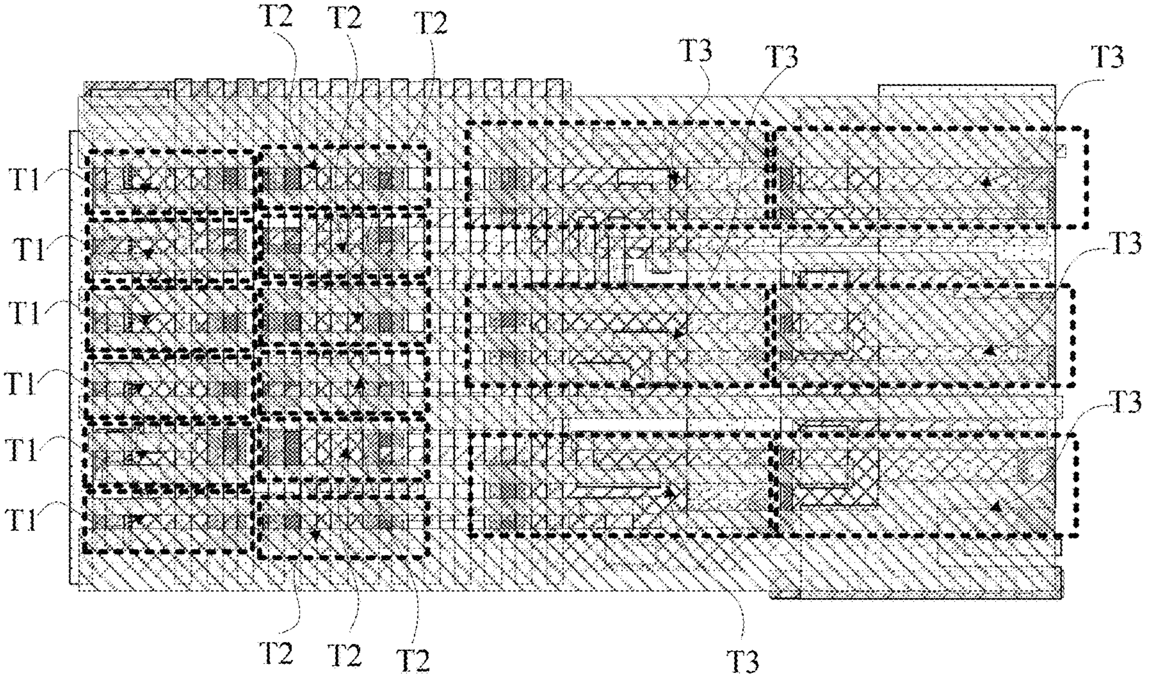
FIG. 18 is a schematic diagram after a fourth conductive layer is formed in an exemplary embodiment of the present disclosure.

In an exemplary embodiment, FIG. 17 is a schematic diagram of a structure of a fourth conductive layer in a display substrate of an exemplary embodiment of the present disclosure. As shown in FIG. 17, the fourth conductive layer may include a first power supply line VDD, a fifth power supply line AVDD, a third first connection line L2051, a third second connection line L530, and a third third connection line L600. For example, the first power supply line VDD, the fifth power supply line AVDD, the third first connection line L2051, the third second connection line L530, and the third third connection line L600 all extend in the first direction DR1.

In an exemplary embodiment, as shown in FIG. 17, the first power line VDD extends along the first direction DR1.

In an exemplary embodiment, as shown in FIGS. 9 to 18, the first power supply line VDD extending in the first direction DR1 is disposed in different layers from the scan signal line Scan extending in the first direction DR1 and the reference signal line Vref extending in the first direction DR1.

In an exemplary embodiment, as shown in FIGS. 9 to 18, the first power supply line VDD is connected to the second third connection electrode L304 through the second third via VL304. Thus, the first power supply line VDD may be connected to the first electrode 304 of the third transistor T3 through the second third Via VL304, the second third connection electrode L304, and the first fourth via V304 in turn.

In an exemplary embodiment, as shown in FIGS. 9 to 18, the first power supply lines VDD may be provided as at least two. Thus in each repeating unit, the first electrodes 304 of the plurality of third transistors T3 may be controlled by at least two first power supply lines VDD.

In an exemplary embodiment, an orthographic projection of a first power supply line VDD extending in the first direction DR1 on the substrate may be located between an orthographic projection of a reference signal line Vref extending in the first direction DR1 on the substrate and an orthographic projection of a scan signal line Scan extending in the first direction DR1 on the substrate. Because the signal transmitted by the first power supply line VDD is a direct current signal, and the signal transmitted by the scan signal line Scan and the signal transmitted by the reference signal line Vref are both jump signals, thus mutual interference between the reference signal line Vref and the scan signal line Scan may be effectively shielded by adopting the arrangement. Therefore, the stability of the circuit may be improved.

In an exemplary embodiment, as shown in FIGS. 9 to 18, the fifth power supply line AVDD is connected to the second first connection line L421 through the second fifth via VL421. Thus, the fifth power supply line AVDD is connected to the second contact region 420 through the second fifth via VL421, the second first connection line L421, the first seventh via V421, the first third connection line 421, and the eleventh contact hole V420 in turn. Thus, high voltage bias of the N-type well region may be achieved by the high-level signal supplied by the fifth power supply line AVDD. Furthermore, the stability of the circuit may be improved.

In an exemplary embodiment, the orthographic projection of the fifth power supply line AVDD extending in the first direction DR1 on the substrate is at least partially overlapped with the orthographic projection of the reference signal line Vref extending in the first direction DR1 on the substrate.

In an exemplary embodiment, as shown in FIGS. 9 to 18, the third first connection line L2051 is connected to the second second connection electrode L205 through the second second via VL205. Thus, the third first connection line L2051 is connected to the second electrode 205 of the second transistor T2 through the second second via VL205, the second second connection electrode L205 and the first third via V205 in turn.

In an exemplary embodiment, as shown in FIGS. 9 to 18, a third second connection line L530 is connected to a fourth power supply line GND (also referred to as a ground line GND) through a second sixth via V530. So that the fourth power supply line GND in one repeating unit is led out to facilitate connection with the fourth power supply line GND in the other repeating unit.

In an exemplary embodiment, as shown in FIGS. 9 to 18, the third third connection line L600 is connected to the second first connection electrode L105 through the second first via VL105, and is connected to the second fourth connection electrode L306 through the second fourth via VL306. Thus, the third third connection line L600 is connected to the second electrode 105 of the first transistor T1 through the second first via VL105, the second first connection electrode L105 and the first second via V105, and is connected to the control electrode 303 of the third transistor T3 through the second fourth via VL306, the second fourth connection electrode L306, the first fifth via V306, the gate connection electrode 306 and the ninth contact hole V303. That is, it is achieved to connect the second electrode 105 of the first transistor T1 to the control electrode 303 of the third transistor T3 by the wirings in the second conductive layer, the third conductive layer and the fourth conductive layer.

(5) Sequentially forming a fourth insulating layer, a fifth conductive layer and a sixth conductive layer on the substrate on which the aforementioned structure is formed.

Figure 19:
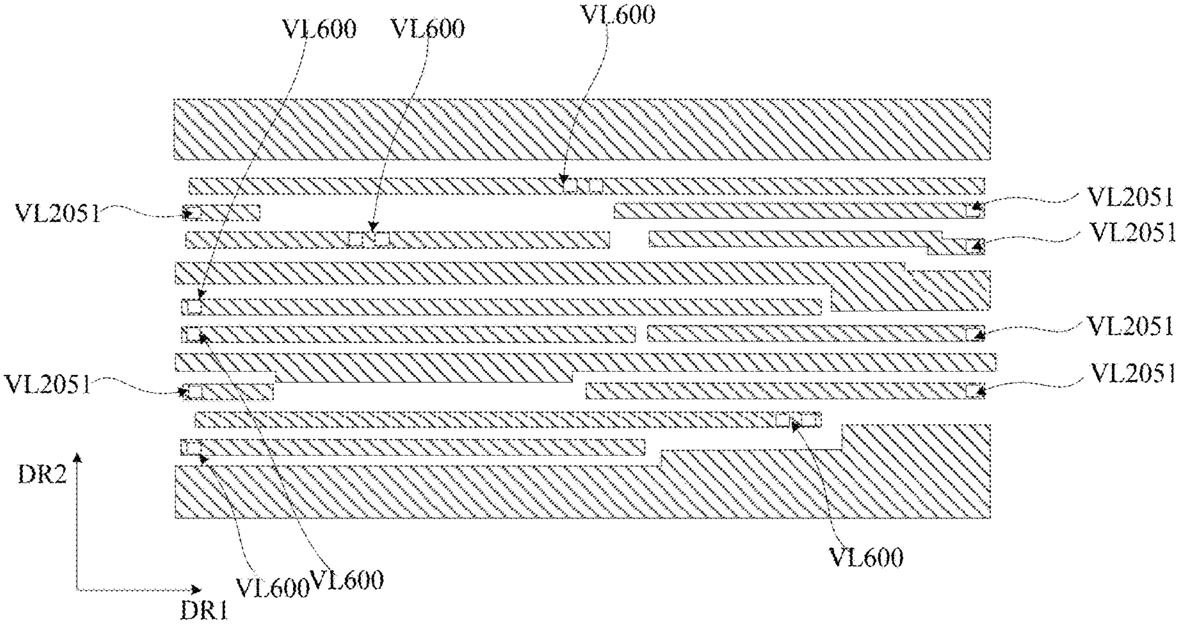
FIG. 19 is a schematic diagram of structures of a fourth conductive layer and a fourth insulating layer in a display substrate of an exemplary embodiment of the present disclosure.

In an exemplary embodiment, FIG. 19 is a schematic diagram of structures of a fourth conductive layer and a fourth insulating layer in a display substrate of an exemplary embodiment of the present disclosure. As shown in FIG. 19, a plurality of vias may be provided on the fourth insulating layer, and the plurality of vias may include a third first via VL2051 and a third second via VL600. For example, the fourth insulating layer may also be referred to as a third via (Via3) layer.

In an exemplary embodiment as, shown in FIG. 19, one or more of the third first via VL2051 and the third second via VL600 may be provided as at least two.

In an exemplary embodiment, the material of the fifth conductive layer may be a metal material. The fifth conductive layer may also be referred to as a fourth metal (Metal4) layer.

Figure 20:
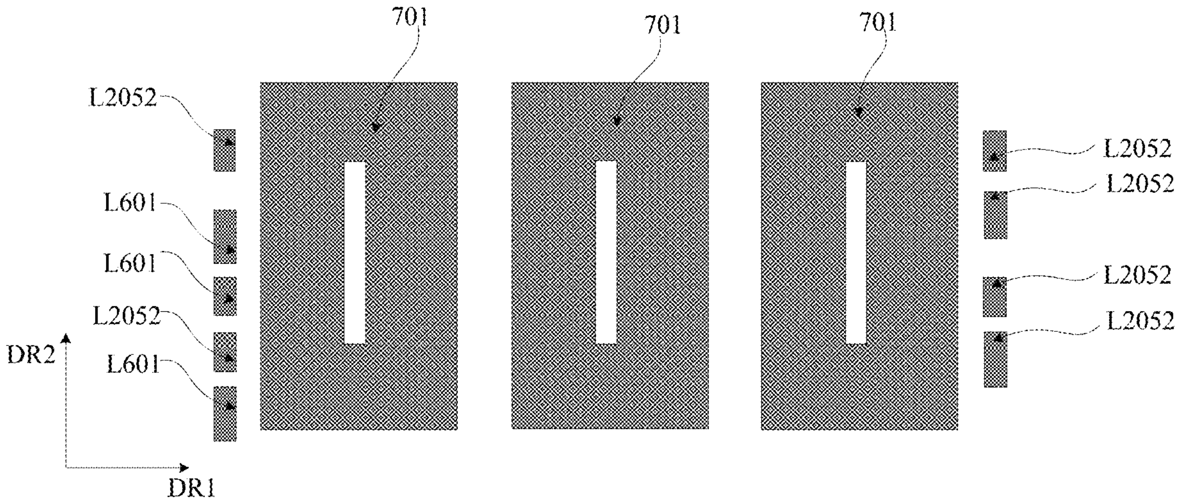
FIG. 20 is a schematic diagram of a structure of a fifth conductive layer in a display substrate of an exemplary embodiment of the present disclosure.
Figure 21:
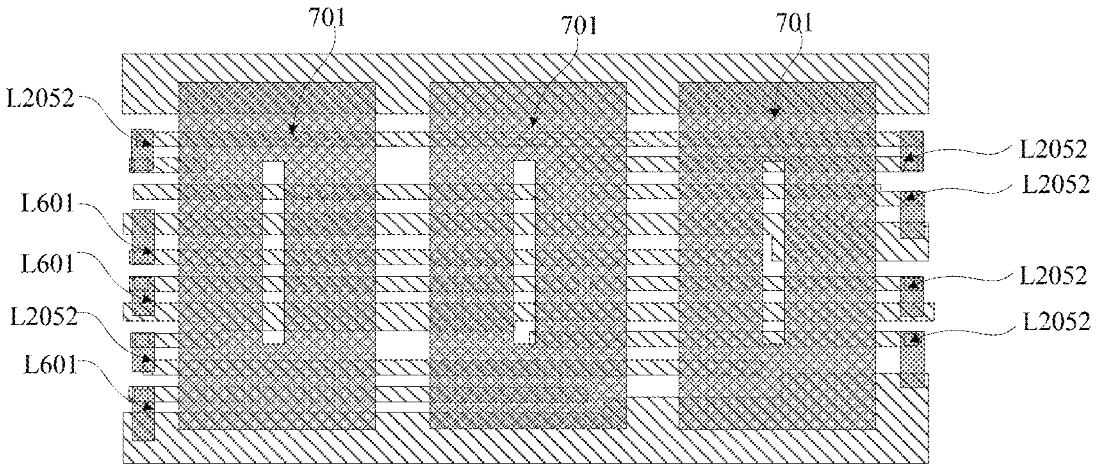
FIG. 21 is a schematic diagram of a fourth conductive layer, a fourth insulating layer, and a fifth conductive layer in a display substrate of an exemplary embodiment of the present disclosure.

In an exemplary embodiment, FIG. 20 is a schematic diagram of a structure of a fifth conductive layer in a display substrate of an exemplary embodiment of the present disclosure, and FIG. 21 is a schematic diagram of a fourth conductive layer, a fourth insulating layer, and a fifth conductive layer in a display substrate of an exemplary embodiment of the present disclosure. As shown in FIGS. 20 and 21, the fifth conductive layer may include a part of a first electrode plate 701 of a plurality of storage capacitors Cst, a fourth first connection electrode L2052, and a fourth second connection electrode L601.

In an exemplary embodiment, a part of the first electrode plate 701 of the plurality of storage capacitors Cst is connected to a part of the plurality of third third connection line L600 through a part of the plurality of third second via VL600. Thus, a part of the second electrode 105 of the first transistor T1 and a part of the control electrode 303 of the third transistor T3 may be connected to a part of the first electrode plate 701 of the plurality of storage capacitors Cst by the wirings in the second, third, fourth and fifth conductive layer.

In an exemplary embodiment, in each repeating unit, the orthographic projection of at least one of the first electrode plates of the plurality of storage capacitors on the substrate at least partially overlap the orthographic projection of the control electrodes of the plurality of first transistors on the substrate and at least partially overlap the orthographic projection of the control electrodes of the plurality of second transistors on the substrate. Alternatively, the orthographic projection of at least one of the first electrode plates of the plurality of storage capacitors on the substrate at least partially overlap the orthographic projection of at least a part of the control electrodes of the plurality of third transistors on the substrate. For example, as shown in FIGS. 9 to 21, the fifth conductive layer may include: a first electrode plate 701 of a first storage capacitor, a first electrode plate 701 of a second storage capacitor and a first electrode plate 701 of a third storage capacitor arranged in sequence in a first direction. Wherein, the orthographic projection of the first electrode plate 701 of the first storage capacitor on the substrate is at least partially overlapped with the orthographic projection of the control electrode 103 of the first transistor T1 on the substrate and at least partially overlapped with the orthographic projection of the control electrode 203 of the second transistor T2 on the substrate. The orthographic projection of the first electrode plate 701 of the second storage capacitor on the substrate is at least partially overlapped with the orthographic projection of the control electrode 303 of at least part of the plurality of third transistors T3 on the substrate. The orthographic projection of the first electrode plate 701 of the third storage capacitor on the substrate is at least partially overlapped with the orthographic projection of the control electrode 303 of at least part of the plurality of third transistors T3 on the substrate.

In an exemplary embodiment, as shown in FIGS. 9 to 21, the fourth first connection electrode L2052 is connected to the third first connection line L2051 through a third first via VL2051. Thus, the fourth first connection electrode L2052 is connected to the second electrode 205 of the second transistor T2 through the third first via VL2051, the third first connection line L2051, the second second via VL205, the second second connection electrode L205 and the first three via V205 in turn.

In an exemplary embodiment, as shown in FIGS. 9 to 21, the fourth second connection electrode L601 is connected to another part of a plurality of third third connection lines L600 through another part of a plurality of third second vias VL600, so as to lead out another part of the second electrode 105 of the first transistor T1 and another part of the control electrode 303 of the third transistor T3.

In an exemplary embodiment, the structure of the fifth conductive layer may be a MIM (Metal-Insulator-Metal) structure. The fifth conductive layer may also be referred to as the MIM layer.

Figure 22:
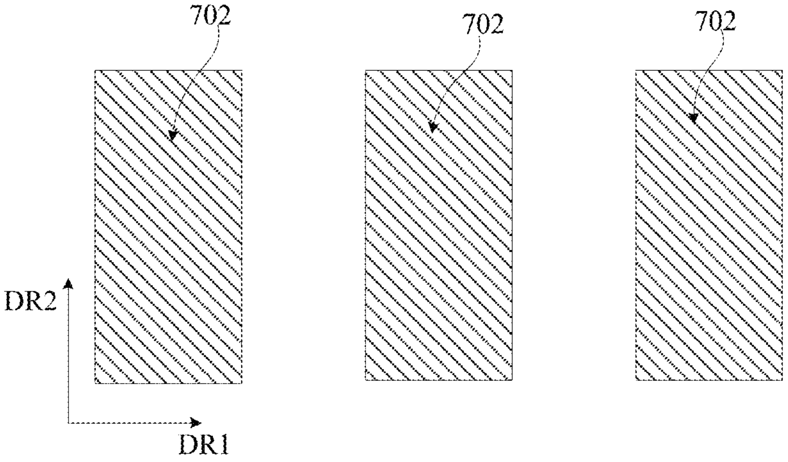
FIG. 22 is a schematic diagram of a structure of a sixth conductive layer in a display substrate of an exemplary embodiment of the present disclosure.

In an exemplary embodiment, FIG. 22 is a schematic diagram of a structure of a sixth conductive layer in a display substrate of an exemplary embodiment of the present disclosure. As shown in FIG. 22, the sixth conductive layer may include: a second electrode plate of the storage capacitors Cst.

(6) Sequentially forming a fifth insulating layer and a seventh conductive layer on the substrate on which the aforementioned structure is formed.

Figure 23:
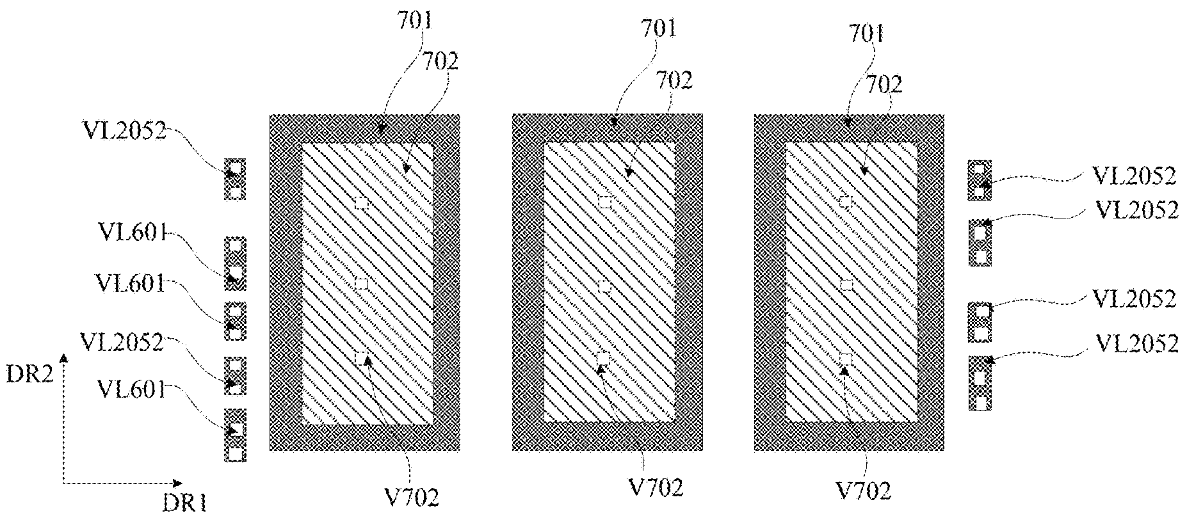
FIG. 23 is a schematic diagram of structures of a fifth conductive layer, a sixth conductive layer, and a fifth insulating layer in a display substrate of an exemplary embodiment of the present disclosure.

In an exemplary embodiment, FIG. 23 is a schematic diagram of structures of a fifth conductive layer, a sixth conductive layer, and a fifth insulating layer in a display substrate of an exemplary embodiment of the present disclosure. As shown in FIG. 23, a plurality of vias may be provided on the fifth insulating layer, which may include a fourth first via VL2052, a fourth second via VL601, and a fourth third via V702. For example, the fifth insulating layer may also be referred to as a fourth via (Via4) layer.

In an exemplary embodiment, as shown in FIG. 23, one or more of the fourth first via VL2052, the fourth second via VL601, and the fourth third via V702 may be provided as at least two.

In an exemplary embodiment, the material of the seventh conductive layer may be a metal material. The seventh conductive layer may also be referred to as a fifth metal (Metal5) layer.

Figure 24:
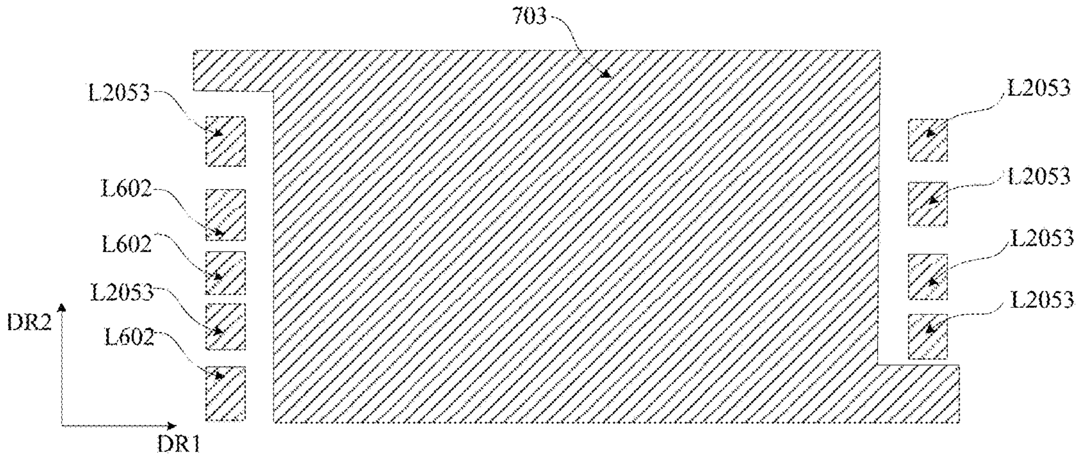
FIG. 24 is a schematic diagram of a structure of a seventh conductive layer of a display substrate of an exemplary embodiment of the present disclosure.
Figure 25:
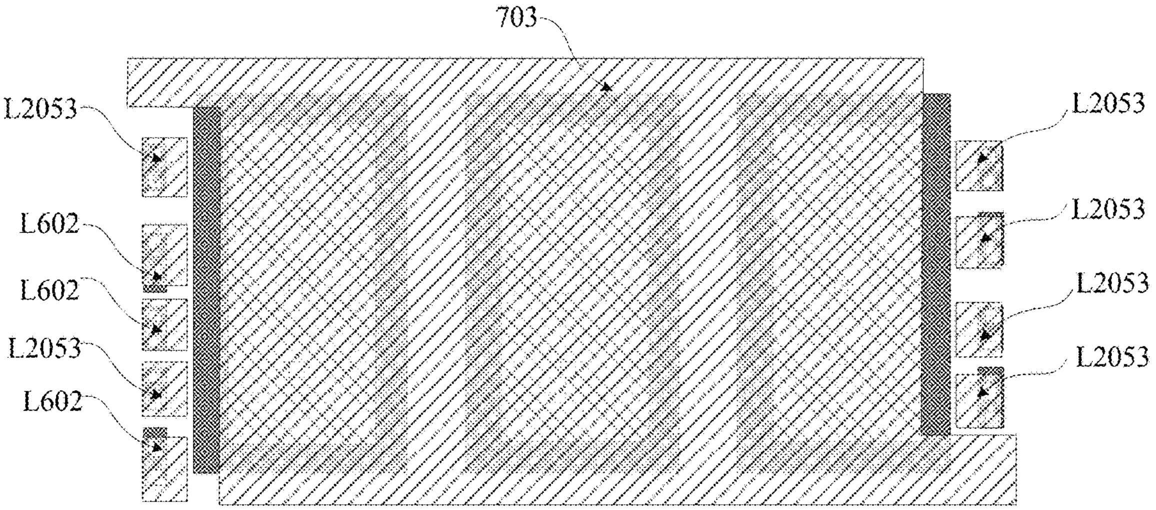
FIG. 25 is a schematic diagram of structures of a fifth conductive layer, a sixth conductive layer, a fifth insulating layer, and a seventh conductive layer in a display substrate of an exemplary embodiment of the present disclosure.

In an exemplary embodiment, FIG. 24 is a schematic diagram of a structure of a seventh conductive layer of a display substrate of an exemplary embodiment of the present disclosure. As shown in FIG. 24, the seventh conductive layer may include a fifth first switch electrode 703, a fifth second switch electrode L602, and a fifth third switch electrode L2053.

In an exemplary embodiment, as shown in FIG. 24, the fifth first switch electrode 703 is a planar electrode and may serve as another part of the first electrode plate 701 of the plurality of storage capacitors Cst. A spacing part between the fifth first switch electrode 703 and the second electrode plate 702 of the storage capacitor Cst forms another part of the storage capacitor Cst.

In an exemplary embodiment, as shown in FIGS. 9 to 25, the fifth first switch electrode 703 is connected to the second electrode plate 702 of the storage capacitor Cst through the fourth third via V702.

In an exemplary embodiment, as shown in FIGS. 9 to 25, the fifth second switch electrode L602 is connected to the fourth second connection electrode L601 through the fourth second via VL601, so as to lead out another part of the second electrode 105 of the first transistor T1 and another part of the control electrode 303 of the third transistor T3.

In an exemplary embodiment, as shown in FIGS. 9 to 25, the fifth third switch electrode L2053 is connected to the fourth first connection electrode L2052 through the fourth first via VL2052. Thus, the fifth third switch electrode L2053 is connected to the second electrode 205 of the second transistor T2 through the fourth first via VL2052, the fourth first connection electrode L2052, the third first via VL2051, the third first connection line L2051, the second second via VL205, the second second connection electrode L205 and the first third via V205 in sequence.

(7) Sequentially forming a sixth insulating layer and an eighth conductive layer on the substrate on which the aforementioned structure is formed.

Figure 26:
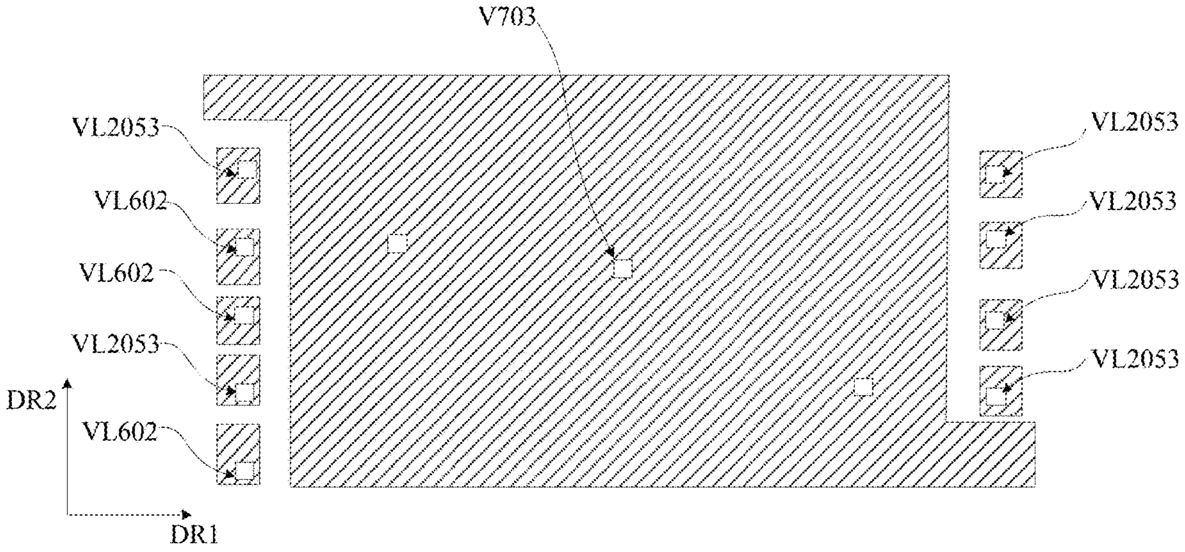
FIG. 26 is a schematic diagram of structures of a seventh conductive layer and a sixth insulating layer in a display substrate of an exemplary embodiment of the present disclosure.

In an exemplary embodiment, FIG. 26 is a schematic diagram of structures of a seventh conductive layer and a sixth insulating layer in a display substrate of an exemplary embodiment of the present disclosure. As shown in FIG. 26, a plurality of vias may be provided on the sixth insulating layer, and the plurality of vias may include a fifth first via VL2053, a fifth second via VL602, and a fifth third via V703. For example, the sixth insulating layer may also be referred to as a fifth via (Via5) layer.

In an exemplary embodiment, as shown in FIG. 26, one or more of the fifth first Via VL2053, the fifth second Via VL602, and the fifth third Via V703 may be provided as at least two.

In an exemplary embodiment, the material of the eighth conductive layer may be a metal material. The eighth conductive layer may also be referred to as a sixth metal (Metal6) layer.

Figure 27:
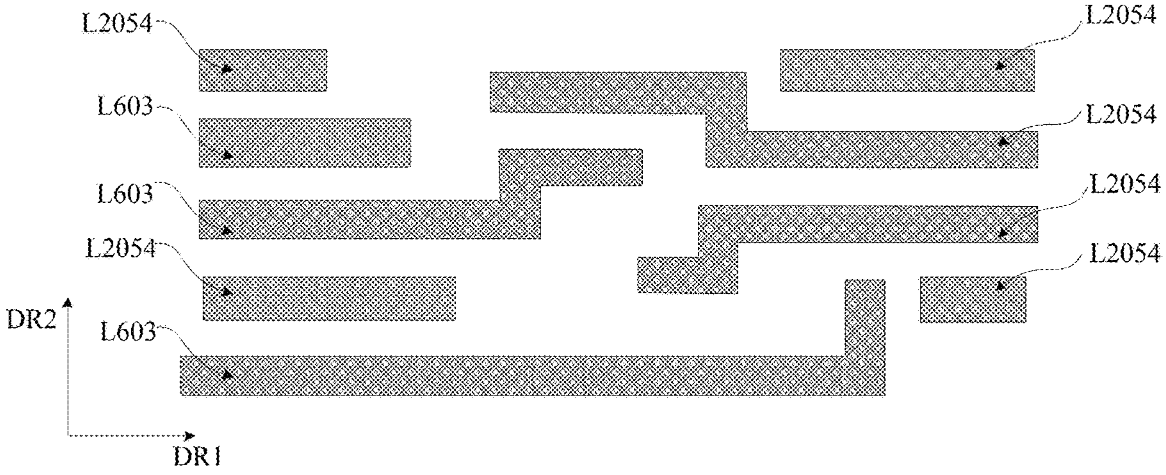
FIG. 27 is a schematic diagram of a structure of an eighth conductive layer of a display substrate of an exemplary embodiment of the present disclosure.

In an exemplary embodiment, FIG. 27 is a schematic diagram of a structure of an eighth conductive layer of a display substrate of an exemplary embodiment of the present disclosure. As shown in FIG. 27, the eighth conductive layer may include a sixth first switch line L2054 and a sixth second switch line L603.

In an exemplary embodiment, as shown in FIGS. 2 and 9 to 27, the sixth first switch line L2054 is connected to the fifth third switch electrode L2053 through the fifth first via VL2053. Thus, the sixth first switch line L2054 is connected to the second electrode 205 of the second transistor T2 through the fifth first via VL2053, the fifth third switch electrode L2053, the fourth first via VL2052, the fourth first connection electrode L2052, the third first via VL2051, the third first connection line L2051, the second second via VL205, the second second connection electrode L205 and the first third via V205 in sequence. Thus, it is achieved to lead out the second electrode 205 of the second transistor T2 so as to connect with the first electrode of the light emitting element formed subsequently by the wirings in the second conductive layer, the third conductive layer, the fourth conductive layer, the fifth conductive layer, the seventh conductive layer and the eighth conductive layer.

In an exemplary embodiment, as shown in FIGS. 2 and 9 to 27, the sixth second switch line L603 is connected to the fifth second switch electrode L602 through the fifth second via VL602, and is connected to the fifth first switch electrode 703 through the fifth third via V703. As such the fifth first switch electrode 703 may serve as another part of the first electrode plate 701 of the plurality of storage capacitors Cst. Thus, through the wirings in the second conductive layer, the third conductive layer, the fourth conductive layer, the fifth conductive layer, the seventh conductive layer and the eighth conductive layer, the other part of the second electrode 105 of the first transistor T1 and the other part of the control electrode 303 of the third transistor T3 can be connected to the fifth first transition electrode 703.

As such, according to that pixel circuit structure, By optimizing and designing layout, giving full play to layout space and optimizing transistor arrangement reasonably, smaller layout area may be achieved, the area of the subpixel occupied by pixel circuit may be reduced, which is beneficial to the reduction of pixel size (for example, pixel area satisfying 4.5 $\mu$m*3.15 $\mu$m=13.23 $\mu m^2$ may be achieved), and higher PPI and better display effect may be achieved.

In an exemplary embodiment, the second conductive layer, the third conductive layer, the fourth conductive layer, the fifth conductive layer, the seventh conductive layer and the eighth conductive layer may be made of metal materials, such as any one or more of argentum (Ag), copper (Cu), aluminum (Al) and molybdenum (Mo), or alloy materials formed by the above metals, such as Aluminum neodymium (AlNd) alloy or Molybdenum Niobium (MoNb) alloy, and may have a single-layer structure or a multi-layer composite structure, such as Mo/Cu/Mo. The illustrative embodiment of the disclosure does not limit this.

In an exemplary embodiment, the first insulating layer, the second insulating layer, the third insulating layer, the fourth insulating layer and the fifth insulating layer may be made of any one or more of silicon oxide (SiOx), silicon nitride (SiNx) and silicon oxynitride (SiON), and may be a single layer, multiple layers or a composite layer. The illustrative embodiment of the disclosure does not limit this.

In an exemplary embodiment, the planar shape of the hole (via or contact hole) may be rectangular (e.g. square) or circular or the like. For example, the dimensions of a plurality of holes (vias or contact holes) in each insulating layer may be the same. The illustrative embodiment of the disclosure does not limit this.

In an exemplary embodiment, signal lines such as a scan signal line Scan, a reference signal line Vref, a first power supply line VDD, or a fourth power supply line GND may represent at least a part (e.g., a part located in a display region) of wirings transmitting a corresponding signal to a repeating unit.

(8) As shown in FIG. 1A, sequentially forming a pixel define layer and a light emitting element 12 on a substrate on which the aforementioned structures are formed, wherein, the light emitting element 12 may include a first electrode 121, an organic emitting function layer 122, and a second electrode 123 stacked in sequence.

In an exemplary embodiment, a pixel define film is coated on the substrate on which the aforementioned structure is formed, and a pixel define layer (PDL) pattern is formed through masking, exposure and development processes. The pixel define layer is formed in the sub-pixel in the display region, and the pixel define layer in the sub-pixel is formed with a pixel opening exposing the first electrode 121. Subsequently, an organic emitting function layer 122 is formed in the pixel opening formed above, and the organic emitting function layer 122 is connected to the first electrode 121 of the light emitting element 12. Subsequently, a second electrode 123 film is deposited, and the second electrode 123 film is patterned through a patterning process to form a cathode pattern. The second electrode 123 is respectively connected to the organic emitting function layer 122 and the second power supply line VSS.

In an exemplary embodiment, the pixel define layer may be made of an inorganic material such as silicon oxide (SiOx), silicon nitride (SiNx), or silicon oxynitride (SiON). The illustrative embodiment of the disclosure does not limit this.

The structure and its preparation process shown in the embodiments of the present disclosure are merely illustrative. In some exemplary embodiments, changes in corresponding structures and, addition or deletion of patterning processes may be made according to actual needs.

The "patterning process" mentioned in this embodiment includes processes such as film layer deposition, photoresist coating, mask exposure, development, etching, and photoresist stripping. Deposition may be performed by using a process such as sputtering, evaporation, chemical vapor deposition, or the like, coating may be performed by using a known coating process, and etching may be performed by using a known approach, which are not limited here. In the description of embodiment of the present disclosure, a "thin film" refers to a layer of thin film formed from a certain material on a substrate through a depositing or coating process. If a patterning process or a photo-etching process is not needed for the "thin film" during the entire manufacturing process, the "thin film" may also be referred to as a "layer". If a patterning process or a photo-etching process is needed for the "thin film" during the entire manufacturing process, it is referred to as a "thin film" before the patterning process and referred to as a "layer" after the patterning process. The "layer" after the patterning process or photo-etching process includes at least one "pattern". "A and B are configured on the same layer" in the embodiments of the present disclosure, refers to that A and B are formed simultaneously by a same patterning process.

An embodiment of the present disclosure further provides a driving method. The driving method may be applied to the pixel circuit in one or more of the above exemplary embodiments. The driving method may include a data writing stage and an emitting stage, wherein in the data writing stage, under the control of the signal of the scan signal line, the signal of the data signal line is stored in the storage capacitor and the signal of the data signal line is supplied to the control electrode of the third transistor;

in the emitting stage, the third transistor is turned on under the control of the signal of the data signal line, the second transistor is turned on under the control of the signal of the reference signal line, and the signal of the first power supply line is supplied to the first electrode of the light emitting element through the third transistor and the second transistor to drive the light emitting element to emit light.

In an exemplary embodiment, the driving method may further include an initialization stage, wherein, in the initialization stage, the signal of the initial signal line is supplied to the first electrode of the light emitting element under the control of the signal of the discharge signal line to initialize the light emitting element.

An embodiment of the present disclosure further provides a driving method. The driving method may be applied to the pixel circuit in one or more of the above exemplary embodiments. The driving method may include: a first test stage, wherein, in the first test stage, a connection state of the third transistor is switched from a first connection state to a second connection state under the control of a signal of a test enable signal line, a fixed voltage output by the fourth power supply line is supplied to the third transistor, and the third transistor is controlled to be in a forward bias state; wherein, the first connection state is that the third transistor is connected to the third power supply line, and the second connection state is that the third transistor is connected to the fourth power supply line; a fixed voltage output by the fourth power supply line is supplied to the first electrode of the light emitting element under the control of the signal of the reference signal line to cause the light emitting element to emit light.

An embodiment of the present disclosure further provides a driving method. The driving method may be applied to the pixel circuit in one or more of the above exemplary embodiments. The driving method may include: a second test stage, wherein, in the second test stage, the connection state of the fourth transistor is switched between a third connection state and a fourth connection state under the control of a signal of a switch signal line, and the fourth transistor is supplied with a signal of a monochrome test signal line or a signal of a fourth power supply line; wherein, the third connection state is that the second electrode of the fourth transistor is connected to the monochrome test signal line, and the fourth connection state is that the second electrode of the fourth transistor is connected to the fourth power supply line; a light emitting element connected to the monochrome enable signal line is controlled to emit a monochrome light ray corresponding to the signal of the monochrome enable signal line under the control of a signal of the monochrome enable signal line; The monochrome enable signal line includes: a first enable signal line connected to a light emitting element that emits a first emitting color, a second enable signal line connected to a light emitting element that emits a second emitting color, and a third enable signal line connected to a light emitting element that emits a first emitting color.

Embodiments of the present disclosure further provide a display device, including the display substrate in one or more of the above-mentioned exemplary embodiments and the pixel circuit in one or more of the above-mentioned exemplary embodiments.

In an illustrative embodiment, the display apparatus includes, but is not limited to, an OLED display apparatus or a Micro OLED display apparatus or QLED display apparatus. Here, no limit is made thereto in the embodiment of the present disclosure.

In an exemplary embodiment, a display device may include but is not limited to any product or component with a display function such as a mobile phone, a tablet computer, a television, a display, a notebook computer, a digital photo frame, or a navigator, etc. Here, no limit is made thereto in the embodiment of the present disclosure.

The description of the above embodiments of the display device is similar to the description of the above embodiments of the display substrate and the pixel circuit, and has similar beneficial effects as the embodiments of the display substrate and the pixel circuit. Technical details undisclosed in the display apparatus embodiments of the disclosure may be understood by those skilled in the art with reference to the descriptions about the display substrate and pixel circuit embodiments of the disclosure, which will not be elaborated herein.

Although the implementation modes of the present disclosure are disclosed above, the contents are only implementation modes for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A pixel circuit, comprising: a first transistor, a second transistor, and a third transistor, wherein a control electrode of the first transistor is connected to a scan signal line, a first electrode of the first transistor is connected to a data signal line, and a second electrode of the first transistor is connected to a first node; a control electrode of the second transistor is connected to a reference signal line, a first electrode of the second transistor is connected to a second node, and a second electrode of the second transistor is connected to a first electrode of a light emitting element; a control electrode of the third transistor is connected to the first node, a first electrode of the third transistor is connected to a first power supply line, and a second electrode of the third transistor is connected to the second node; and wherein the first transistor is configured to supply a signal of the data signal line to the third transistor under control of a signal of the scan signal line; the second transistor is configured to supply a signal of the second node to the first electrode of the light emitting element under control of a signal of the reference signal line; and the third transistor is configured to supply a signal of the first power supply line to the second node under control of the signal of the data signal line, the pixel circuit further comprising a first test circuit connected to a test enable signal line, the third transistor, a third power supply line and a fourth power supply line, and is configured to, under control of a signal of the test enable signal line, switch a connection state of the third transistor from a first connection state to a second connection state, supply a fixed voltage output by the fourth power supply line to the third transistor, and control the third transistor to be in a forward bias state; wherein, the first connection state is that a substrate terminal of the third transistor is connected to the third power supply line, and the second connection state is that the substrate terminal of the third transistor is connected to the fourth power supply line; and, the second transistor is configured to, under control of a signal of the reference signal line, supply a fixed voltage output by the fourth power supply line to the first electrode of the light emitting element.

2. The pixel circuit of claim 1, further comprising a storage capacitor, wherein a first electrode plate of the storage capacitor is connected to the first node and a second plate of the storage capacitor is connected to a second power supply line.

3. The pixel circuit of claim 1, further comprising a fourth transistor, wherein a control electrode of the fourth transistor is connected to a discharge signal line, a first electrode of the fourth transistor is connected to the second node, and a second electrode of the fourth transistor is connected to an initial signal line; the fourth transistor is configured to supply a signal of the initial signal line to the second node under control of a signal of the discharge signal line.

4. The pixel circuit of claim 3, wherein the second transistor is further configured to be in a reverse biased state in a case that a short circuit occurs between the first electrode of the light emitting element and a second electrode of the light emitting element.

5. The pixel circuit of claim 1, further comprising a gate voltage control sub-circuit connected to the reference signal line and configured to supply a variable voltage to the control electrode of the second transistor.

6. The pixel circuit of claim 1, wherein a substrate terminal of the third transistor is connected to a third power supply line; the pixel circuit further comprises: substrate voltage control sub-circuit connected to the third power supply line, and is configured to, in a case of being in a high-brightness mode, apply a first voltage to the substrate terminal of the third transistor, or, in a case of being in a low-brightness mode, apply a second voltage to the substrate terminal of the third transistor, wherein an absolute value of the first voltage is greater than an absolute value of the second voltage, a brightness parameter of the high-brightness mode is higher than a preset brightness threshold, and a brightness parameter of the low-brightness mode is not higher than the preset brightness threshold.

7. The pixel circuit of claim 1, wherein the first test circuit comprises a first switch device and a second switch device; a first terminal of the first switch device is connected to the substrate terminal of the third transistor, and a second terminal of the first switch device is connected to the third power supply line; a first terminal of the second switch device is connected to the substrate terminal of the third transistor, and a second terminal of the second switch device is connected to the fourth power supply line;

the first test circuit is configured to, under control of the signal of the test enable signal line, switch the first switch device from an on state to an off state and switch the second switch device from an off state to an on state.

8. The pixel circuit of claim 3, further comprising a second test circuit;

wherein, the control electrode of the fourth transistor is connected to a monochrome enable signal line, and the fourth transistor is further configured to, under control of a signal of the monochrome enable signal line, control a light emitting element connected to the monochrome enable signal line to emit a monochrome light ray corresponding to the signal of the monochrome enable signal line; the monochrome enable signal line comprises a first enable signal line connected to a light emitting element emitting a first color, a second enable signal line connected to a light emitting element emitting a second color, and a third enable signal line connected to a light emitting element emitting a third color;

the second test circuit is connected to the second electrode of the fourth transistor, a switch signal line, a monochrome test signal line, and a fourth power supply line, and is configured to, under control of a signal of the switch signal line, switch a connection state of the fourth transistor between a third connection state and a fourth connection state, and to supply a signal of the monochrome test signal line or a signal of the fourth power supply line to the fourth transistor; wherein, the third connection state is that the second electrode of the fourth transistor is connected to the monochrome test signal line, and the fourth connection state is that the second electrode of the fourth transistor is connected to the fourth power supply line.

9. The pixel circuit of claim 8, wherein the second test circuit comprises a third switch device and a fourth switch device; a first terminal of the third switch device is connected to the second electrode of the fourth transistor, and a second terminal of the third switch device is connected to the monochrome test signal line; a first terminal of the fourth switch device is connected to the second electrode of the fourth transistor, and a second terminal of the fourth switch device is connected to the fourth power supply line.

10. A driving method, applied to the pixel circuit of claim 1, the driving method comprises a data writing stage and an emitting stage, wherein in the data writing stage, supplying a signal of the data signal line to the control electrode of the third transistor under control of the signal of the scan signal line;

in the emitting stage, turning the third transistor on under control of the signal of the data signal line, turning the second transistor on under control of the signal of the reference signal line, and supplying the signal of the first power supply line to the first electrode of the light emitting element through the third transistor and the second transistor to drive the light emitting element to emit light.

11. A driving method, applied to the pixel circuit of claim 1, the driving method comprises a first test stage, wherein in the first test stage, switching the connection state of the third transistor from the first connection state to the second connection state under control of the signal of the test enable signal line, supplying the fixed voltage output by the fourth power supply line to the third transistor, and controlling the third transistor to be in the forward bias state; wherein, the first connection state is that the substrate terminal of the third transistor is connected to the third power supply line, and the second connection state is that the substrate terminal of the third transistor is connected to the fourth power supply line; and supplying the fixed voltage output by the fourth power supply line to the first electrode of the light emitting element under control of the signal of the reference signal line to cause the light emitting element to emit light.

12. A driving method, applied to the pixel circuit of claim 8, the driving method comprises a second test stage, wherein in the second test stage, switching the connection state of the fourth transistor between the third connection state and the fourth connection state under control of the signal of the switch signal line, and supplying the fourth transistor with the signal of the monochrome test signal line or the signal of the fourth power supply line; wherein, the third connection state is that the second electrode of the fourth transistor is connected to the monochrome test signal line, and the fourth connection state is that the second electrode of the fourth transistor is connected to the fourth power supply line; and controlling the light emitting element connected to the monochrome enable signal line to emit the monochrome light ray corresponding to the signal of the monochrome enable signal line under control of the signal of the monochrome enable signal line; the monochrome enable signal line comprises: the first enable signal line connected to the light emitting element that emits a first emitting color, the second enable signal line connected to the light emitting element that emits a second emitting color, and the third enable signal line connected to the light emitting element that emits the third emitting color.

13. A display apparatus, comprising the pixel circuit of claim 1.

14. The pixel circuit of claim 3, further comprising a gate voltage control sub-circuit connected to the reference signal line and configured to supply a variable voltage to the control electrode of the second transistor.

15. The pixel circuit of claim 3, wherein a substrate terminal of the third transistor is connected to a third power supply line; the pixel circuit further comprises: substrate voltage control sub-circuit connected to the third power supply line, and is configured to, in a case of being in a high-brightness mode, apply a first voltage to the substrate terminal of the third transistor, or, in a case of being in a low-brightness mode, apply a second voltage to the substrate terminal of the third transistor, wherein an absolute value of the first voltage is greater than an absolute value of the second voltage, a brightness parameter of the high-brightness mode is higher than a preset brightness threshold, and a brightness parameter of the low-brightness mode is not higher than the preset brightness threshold.

16. The pixel circuit of claim 3, further comprising a first test circuit connected to a test enable signal line, the third transistor, a third power supply line and a fourth power supply line, and is configured to, under control of a signal of the test enable signal line, switch a connection state of the third transistor from a first connection state to a second connection state, supply a fixed voltage output by the fourth power supply line to the third transistor, and control the third transistor to be in a forward bias state; wherein, the first connection state is that a substrate terminal of the third transistor is connected to the third power supply line, and the second connection state is that the substrate terminal of the third transistor is connected to the fourth power supply line; and, the second transistor is configured to, under control of a signal of the reference signal line, supply a fixed voltage output by the fourth power supply line to the first electrode of the light emitting element.

* * * * *